US012715973B2

(12) United States Patent
Chaudhary et al.

(10) Patent No.: US 12,715,973 B2
(45) Date of Patent: Aug. 25, 2026

(54) EXTRUDED FOAMS MANUFACTURED USING HIGHLY BRANCHED ETHYLENE-BASED POLYMERS

(71) Applicant: Dow Global Technologies LLC, Midland, MI (US)

(72) Inventors: Bharat I. Chaudhary, Collegeville, PA (US); Jian Yang, Lake Jackson, TX (US); Arkady L. Krasovskiy, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 584 days.

(21) Appl. No.: 18/254,046

(22) PCT Filed: Nov. 24, 2021

(86) PCT No.: PCT/US2021/060703
§ 371 (c)(1),
(2) Date: May 23, 2023

(87) PCT Pub. No.: WO2022/115516
PCT Pub. Date: Jun. 2, 2022

(65) Prior Publication Data

US 2023/0407034 A1 Dec. 21, 2023

Related U.S. Application Data

(60) Provisional application No. 63/117,725, filed on Nov. 24, 2020.

(51) Int. Cl.
*C08J 9/14* (2006.01)
*C08J 9/00* (2006.01)

(52) U.S. Cl.
CPC ............ *C08J 9/141* (2013.01); *C08J 9/0023* (2013.01); *C08J 2201/03* (2013.01); *C08J 2203/14* (2013.01); *C08J 2205/052* (2013.01); *C08J 2323/08* (2013.01)

(58) Field of Classification Search
CPC ..... C08F 210/02; C08F 279/02; C08J 9/0023; C08J 9/141; C08J 2201/03; C08J 2203/14; C08J 2205/052; C08J 2323/08; C08J 2351/00
See application file for complete search history.

(56) References Cited

U.S. PATENT DOCUMENTS 3,644,230 A 2/1972 Cronin
3,645,992 A 2/1972 Elston
3,914,342 A 10/1975 Mitchell
4,076,698 A 2/1978 Anderson et al.
4,214,054 A 7/1980 Watanabe et al.
4,599,392 A 7/1986 McKinney et al.
4,908,278 A 3/1990 Bland et al.
5,272,236 A 12/1993 Lai et al.
5,278,272 A 1/1994 Lai et al.
5,582,923 A 12/1996 Kale et al.
5,733,155 A 3/1998 Sagawa
5,750,584 A 5/1998 Knaus
5,854,045 A 12/1998 Fang et al.

FOREIGN PATENT DOCUMENTS

JP 2004529231 A 9/2004
WO 2013059042 A1 4/2013
WO 2013078018 A2 5/2013
WO WO-2014120478 A1 * 8/2014 .......... C08F 290/042
WO 2020000336 A1 1/2020
WO 2020112873 A1 6/2020

OTHER PUBLICATIONS

Brazilian Technical Report dated Sep. 23, 2025, pertaining to BR Patent Application No. BR112023009761.4, 8 pgs.
Balke et al. "A Strategy for Interpreting Multidetector Size-Exclusion Chromatogrpahy Data II", Chromatography Polym. Chpt 13, (1992), pp. 199-219.
Kkatochvil "Fundamental Light-Scattering Methods", Classical Light Scattering from Polymer Solutions, Elsevier, Oxford, NY (1987), pp. 113-144.
Williams et al. "The Construciton of a Polyethylene Calibration Curve for Gel Permeation Chromatography Using Polystyrene Fractions", J. Polym. Sci., Polym. Let., 6, 621-624 (1968).
Yau et al. "Examples of Using 3D-GPC-TREF for Polyolefin Characterization", Macromol. Symp., 2007, 257, 29-45.
Zimm "Apparatus and Methods for Measurement and Interpretation of the Angular Variation of Light Scattering; Preliminary Results on Polystyrene Solutions", J. Chem. Phys., 16, 1099-1116 (1948).
International Search Report and Written Opinion dated Mar. 2, 2023, pertaining to Int'l Patent Application No. PCT/US2021/060703, 12 pgs.
Japanese Office Action dated Oct. 28, 2025, pertaining to JP Patent Application No. 2023-530244, 6 pgs.
Chinese Office Action dated Apr. 3, 2026, pertaining to CN Patent Application No. 202180077737.1, 11 pgs.

* cited by examiner

*Primary Examiner* — John M Cooney
(74) *Attorney, Agent, or Firm* — Dinsmore & Shohl LLP

(57) ABSTRACT

An extruded foam includes an ethylene-based polymer composition comprising a polymerized ethylene-base monomer with hydrocarbon-based molecules having the following formula (I), where n is from 3 to 160 and m is from 0 to 50.

(I)

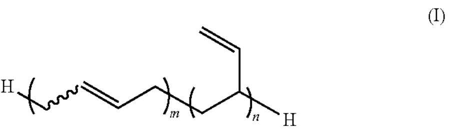

16 Claims, No Drawings

EXTRUDED FOAMS MANUFACTURED USING HIGHLY BRANCHED ETHYLENE-BASED POLYMERS

CROSS-REFERENCE TO RELATED APPLICATIONS

The present application is a National Phase Entry under 35 U.S.C. § 371 of International Patent Application No. PCT/US2021/060703 filed Nov. 24, 2021, which claims priority to U.S. Provisional Patent Application No. 63/117,725 filed Nov. 24, 2020, the entireties of which are incorporated by reference herein.

TECHNICAL FIELD

Embodiments described herein generally relate to extruded polymer foams and specifically relate to extruded polymer foams manufactured using highly branched ethylene-based polymers.

BACKGROUND

Polymer foams, such as ethylene-based polymer foams, are used in a multitude of applications including as insulation and in packaging. In particular, ethylene-based polymer foams of low density are particularly desirable for use in certain applications because ethylene-based polymer foams have good cushioning properties, good dielectric strength and constancy, good water resistance and buoyancy, and good chemical resistance.

SUMMARY

As mentioned above, ethylene-based polymer foams of low density may be preferable polymer foams for certain applications. However, it has been found that certain ethylene-based polymers perform better than other ethylene-based polymers as the base of a foamed structure. For instance, it has been found that long-chain branched (LCB) ethylene-based polymers can yield high melt strength polymers. However, when making extruded foams of low density (typically less than 0.200 g/cm$^3$), the foaming window for known LCB ethylene-based polymers is relatively small and foaming LCB ethylene-based polymers can be difficult.

Therefore, there are needs for extruded foamed polymer products made of ethylene-based polymers with improved properties, such as improved melt strength, optimized viscosity, and a broader molecular weight distribution than conventional extruded ethylene-based polymer foams. Embodiments of extruded ethylene-based polymer foams as disclosed and described herein address these and other needs of conventional extruded polymer foams.

Embodiments of the present disclosure meet those needs, in various embodiments, by providing an extruded foam comprising: an ethylene-based polymer comprising a polymerized ethylene-base monomer with hydrocarbon-based molecules having the following formula:

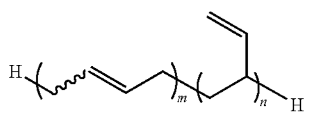

wherein n is from 3 to 160 and m is from 0 to 50.

These and other embodiments are described in more detail in the following Detailed Description.

DETAILED DESCRIPTION

Specific embodiments of the present disclosure will now be described. These embodiments are provided so that this disclosure will be thorough and complete and will fully convey the scope of the claimed subject matter to those skilled in the art.

Unless stated to the contrary, implicit from the context, or customary in the art, all parts and percent values are based on weight, all temperatures are in ° C., and all test methods are current as of the filing date of this disclosure.

The term “polymer” refers to a polymeric compound prepared by polymerizing monomers, whether of a same or a different type. The generic term polymer thus embraces the term “homopolymer,” which usually refers to a polymer prepared from only one type of monomer as well as “copolymer,” which refers to a polymer prepared from two or more different monomers. The term “interpolymer,” as used herein, refers to a polymer prepared by the polymerization of at least two different types of monomers. The generic term interpolymer thus includes a copolymer or polymer prepared from more than two different types of monomers, such as terpolymers.

“Ethylene-based polymer” or “ethylene polymer” or “polyethylene” shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low-density resins (m-LLDPE); Medium Density Polyethylene (MDPE); and High Density Polyethylene (HDPE).

The term “composition,” as used herein, refers to a mixture of materials that comprises the composition, as well as reaction products and decomposition products formed from the materials of the composition.

The term “ethylene/alpha-olefin copolymer,” as used herein, refers to a copolymer that has more than 50 mole percent polymerized ethylene monomer (based on the total amount of polymerizable monomers), and at least one alpha-olefin.

The term “ethylene monomer,” as used herein, refers to a chemical unit having two carbon atoms with a double bond there between, and each carbon bonded to two hydrogen atoms, wherein the chemical unit polymerizes with other such chemical units to form an ethylene-based polymer composition.

The term “LDPE” may also be referred to as “high pressure ethylene polymer” or “highly branched polyethylene” and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference). LDPE resins typically have a density in the range of 0.916 g/cm$^3$ to 0.940 g/cm$^3$.

The term “LLDPE,” includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. Nos. 3,914,342 and 5,854,045). The LLDPE resins can be made via gas-phase, solution-phase, or slurry polymerization or any combination thereof, using any type of reactor or reactor configuration known in the art.

The term "terminal alkene group," as used herein, refers to a double bond between two carbon atoms in a polymer chain, wherein one of the carbons in the double-bond is a $=CH_2$ group. Terminal double bonds are located at terminal ends of polymer chains and/or at branched ends of polymer chains. The term "internal alkene group," as used herein, refers to a 1,2-disubstituted carbon-carbon double bond, the carbon atoms are in a trans-configuration (not cis-configuration). An internal alkene group is located throughout the length of a polymer chain, but not at a terminal end of the polymer chain or at a branched end along a polymer chain. Terminal alkene groups and internal alkene groups are measured by infrared spectroscopy ("IR").

The term "alkene content," as used herein, refers to the number of terminal alkene groups plus the number of internal alkene groups, present in a polymer chain for every 1000 carbon atoms. Alkene content is measured by infrared spectroscopy ("IR").

The term "HDPE" refers to polyethylenes having densities greater than about 0.935 g/cm$^3$ and up to about 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "hydrocarbon-based molecule," as used herein, refers to a chemical component that has only carbon atoms and hydrogen atoms.

"Blend," "polymer blend," and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Ethylene-Based Polymers

Ethylene-based polymer compositions used to manufacture ethylene-based polymer foams according to embodiments disclosed and described herein will now be described in more detail. The ethylene-based polymer composition includes the polymerization product of ethylene monomer and a mixture of hydrocarbon-based molecules having three or more terminal alkene groups.

In embodiments, the ethylene-based polymer composition is formed from a process involving high pressure (greater than 100 MPa) and free-radical polymerization. Ethylene monomer and a mixture of hydrocarbon-based molecules having three or more terminal alkene groups are reacted together to form the ethylene-based polymer composition. The polymerization process is discussed in detail below.

The ethylene-based polymer composition is the polymerization reaction product of ethylene and the mixture of hydrocarbon-based molecules having three or more terminal alkene groups. The hydrocarbon-based molecules have only carbon atoms and hydrogen atoms, and have three or more terminal alkene groups. The term "hydrocarbon-based molecules comprising three or more terminal alkene groups," (or interchangeably referred to as "hydrocarbon-based molecules") as used herein, refers to a chemical component that is a polymer chain composed of only carbon atoms and hydrogen atoms, the polymer chain being branched and having three or more terminal ends wherein an alkene group (i.e. carbon-carbon double) bond is present at each terminal end. The term "mixture of hydrocarbon-based molecules," as used herein, refers to two or more hydrocarbon-based molecules, wherein at least two of the molecules differ in structure, property, and/or composition.

In embodiments, the number of terminal alkene groups present in each of the hydrocarbon-based molecules is from 3, or 5, or 7, or 8 to 17, or 18. In a further embodiment, the number of terminal alkene groups present in each of the hydrocarbon-based molecules is from 3 to 40, or from 5 to 40, or from 10 to 40, or from 12 to 20. By way of example, the mixture of hydrocarbon-based molecules may include a first hydrocarbon-based molecule having three terminal alkene groups and a second hydrocarbon-based molecule having twelve terminal alkene groups.

In embodiments, each of the hydrocarbon-based molecules in the mixture has the Structure I:

Structure I

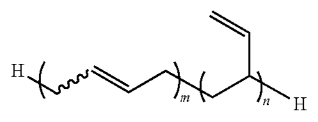

wherein n (the number of terminal alkene groups) is from 3 to 160, and m (the number of internal alkene groups) is from 0 to 50. In one or more embodiments, n is from 3, or 5, or 10, or 20, or 30, or 40, and m is from 0, or 10, or 20, or 40, or 50. In embodiments, n is from 3 to 160, or from 5 to 100, or from 9 to 40, and m is from 0 to 30, or from 1 to 20, or from 2 to 10.

In an embodiment, mixture of hydrocarbon-based molecules consist of two or more hydrocarbon-based molecules having Structure I:

Structure I

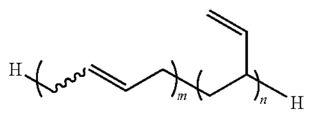

wherein n is the number of terminal alkene groups, m is the number of internal alkene groups, and the average n content in the mixture of hydrocarbon-based molecules is from 9 to 40, and the average m content is from 1 to 10. The "average n content" is calculated by dividing the number average molecular weight (Mn) by the weight average molecular weight (Mw) of the hydrocarbon-based molecule, then multiplying by the fractional amount of terminal alkene groups. The "average m content" is calculated by dividing the number average molecular weight (Mn) by the weight average molecular weight (Mw) of the hydrocarbon-based molecule, then multiplying by the fractional amount of internal alkene groups.

In embodiments, mixture of hydrocarbon-based molecules has respective average n content and average m content (denoted as "n/m", see Structure I for each hydrocarbon-based molecule) as follows: 9-40/1-10, or 12-38/2-8, or 13-37/2-6, or 15-35/2-6, or 19/3, or 33/5.

In embodiments, the mixture of hydrocarbon-based molecules based on Structure I has a molecular weight distribution from 1.2 to 20. In one or more embodiments, the mixture of hydrocarbon-based molecules based on Structure I has a molecular weight distribution from 1.2, or 1.3, or 1.4 to 2, or 5 to 10 or 20. In embodiments, the mixture of hydrocarbon-based molecules based on Structure I has a molecular weight distribution from 1.2 to 20, or from 1.3 to 10, or from 1.5 to 5.

In embodiments, each of the hydrocarbon-based molecules has the Structure II.

Struture II

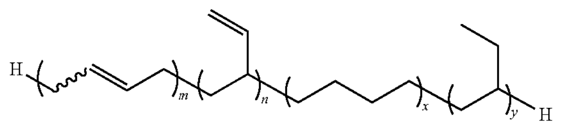

wherein n is from 3 to 160, and m is from 0 to 50; x is from 0 to 160, and y is from 0 to 50. In one or more embodiments, n is from 3, or 5, or 10, or 20, or 30, or 40, or 50 to 60, or 70 to 80, or 90, or 100, or 110, or 120, or 130, or 140, or 150, or 160, and m is from 0, or 10, or 20 to 30, or 40, or 50; x is from 0, or 1, or 5, or 10, or 20, or 30, or 40, or 50 to 60, or 70 to 80, or 90, or 100, or 110, or 120, or 130, or 140, or 150, or 160, and y is from 0, or 1, or 10, or 20 to 30, or 40, or 50. In embodiments, n is from 3 to 160, or from 5 to 150, or from 9 to 140, or from 9 to 100, or from 9 to 50, or from 9 to 30, m is from 0 to 30, or from 1 to 20, or from 1 to 10, x is from 0 to 160, or from 1 to 50, or from 1 to 20, or from 1 to 10, and y is from 0 to 50, or from 1 to 20, or from 1 to 10.

The hydrocarbon-based molecules of Structure I and/or Structure II described above are hereafter interchangeably referred to as "branching agent."

The notation "〰" in Structure I and in Structure II represents a cis alkyl group or a trans alkyl group with respect to the double bond.

In embodiments, a mixture of hydrocarbon-based molecules having the Structure I and/or the Structure II, with differing molecular weights, is used.

It should be understood that the present ethylene-based polymer composition may include (i) Structure I only, (ii) Structure II only, or (iii) a combination of Structure I and Structure II. According to embodiments, the term "ethylene-based polymer composition," as used herein, refers to the polymer that is the reaction product of ethylene with Structure I and/or Structure II.

In embodiments, the ethylene-based polymer composition includes, in polymerized form, from 95 wt. %, or 96 wt. %, or 97 wt. %, or 98 wt. % to 99 wt. %, or 99.5 wt. %, or 99.7 wt. %, or 99.9 wt. % of ethylene, and a reciprocal amount of the mixture of hydrocarbon-based molecules, or from 5.0 wt. %, or 4.0 wt. %, or 3.0 wt. %, or 2.0 wt. % to 1.0 wt. %, or 0.5 wt. %, or 0.3 wt. %, or 0.1 wt. % of the mixture of the hydrocarbon-based molecules. Weight percent is based on total weight of the ethylene-based polymer composition. In one or more embodiments, the ethylene-based polymer composition includes, in polymerized form, from 95.0 wt. % to 99.9 wt. %, or from 96 wt. % to 99.8 wt. %, or from 98 wt. % to 99.8 wt. % of ethylene, and the mixture of hydrocarbon-based molecules is present in an amount from 5.0 wt. % to 0.1 wt. %, or from 4.0 wt. % to 0.2 wt. %, or from 2.0 wt. % to 0.2 wt. %.

According to one or more embodiments, the ethylene-based polymer composition has a density from 0.909 g/cc to 0.940 g/cc. In embodiments, the ethylene-based polymer composition has a density from 0.909 g/cc, or 0.915 g/cc, or 0.920 g/cc to 0.930 g/cc, or 0.935 g/cc, or 0.940 g/cc. In embodiments, the ethylene-based polymer composition has a density from 0.910 g/cc to 0.940 g/cc, or from 0.915 g/cc to 0.935 g/cc, or from 0.917 g/cc to 0.930 g/cc, or from 0.917 g/cc to 0.926 g/cc.

In embodiments, the ethylene-based polymer composition has a melt index ($I_2$) from 0.10 g/10 min to 200 g/10 min. In one or more embodiments, the ethylene-based polymer composition has a melt index from 0.1 g/10 min, or 0.5 g/10 min, or 1.0 g/10 min, or 3.0 g/10 min, or 5.0 g/10 min, or 10 g/10 min, or 20 g/10 min, or 30 g/10 min, or 40 g/10 min, to 50 g/10 min, or 60 g/10 min, 70 g/10 min, or 75 g/10 min, or 80 g/10 min, or 90 g/10 min, or 100 g/10 min. In embodiments, the ethylene-based polymer composition has a melt index from 0.1 g/10 min to 200 g/10 min, or from 0.1 g/10 min to 100 g/10 min, or from 0.1 g/10 min to 80 g/10 min, or from 0.1 g/10 min to 20 g/10 min.

In an embodiment, the ethylene-based polymer composition has a melt index ($I_2$) from 0.1 g/10 min to 8.0 g/10 min.

In embodiments, the ethylene-based polymer composition has an alkenes content from 0.05/1000 carbons, or 0.15/1000 carbons, or 0.3/1000 carbons, or 0.4/1000 carbons, to 1.0/1000 carbons, or 2.0/1000 carbons, or 3.0/1000 carbons. In one or more embodiments, the ethylene-based polymer composition has an alkenes content from 0.05/1000 carbons to 3.0/1000 carbons, or from 0.05/1000 carbons to 1/1000 carbons, or from 0.08/1000 carbons to 1/1000 carbons.

In an embodiment, the ethylene-based polymer composition has a melt strength from 0.1 cN to 100 cN, and a melt index from 0.1 g/10 min to 100 g/10 min.

In an embodiment, the ethylene-based polymer composition has a G' value greater than or equal to C+D $\log(I_2)$, wherein C is 185 Pa and D is −90 Pa/log(g/10 min), wherein 12 is the melt index of the ethylene-based polymer composition, Pa is Pascals ($N/m^2$), and log(g/10 min) is the logarithm of the melt index of the ethylene-based polymer composition.

In embodiments, the ethylene-based polymer composition has a GI200 value from 0 $mm^2/24.6\ cm^3$ to 20 $mm^2/24.6\ cm^3$. In one or more embodiments, the ethylene-based polymer composition has a GI200 value from 0 $mm^2/24.6\ cm^3$, or 0.05 $mm^2/24.6\ cm^3$, or 0.3 $mm^2/24.6\ cm^3$, to 0.7 $mm^2/24.6\ cm^3$, 5 $mm^2/24.6\ cm^3$, or 20 $mm^2/24.6\ cm^3$. In embodiments, the ethylene-based polymer composition has a GI200 value from 0 $mm^2/24.6\ cm^3$ to 20 $mm^2/24.6\ cm^3$, or from 0.05 $mm^2/24.6\ cm^3$ to 5 $mm^2/24.6\ cm^3$, or from, 0.3 $mm^2/24.6\ cm^3$ to 0.7 $mm^2/24.6\ cm^3$.

In embodiments, the ethylene-based polymer composition has a density from 0.900 g/cc to 0.940 g/cc, and a melt index from 0.1 g/10 min to 200 g/10 min. In one or more embodiments, the ethylene-based polymer composition has a density from 0.900 g/cc, or 0.910 g/cc, or 0.920 g/cc to 0.925 g/cc, or 0.930 g/cc, and a melt index from 0.1 g/10 min, or 2.0 g/10 min, or 3.0 g/10 min to 9.0 g/10 min, or 10 g/10 min, or 100 g/10 min. In embodiments, the ethylene-based polymer composition has a density from 0.900 g/cc to 0.940 g/cc, or from 0.910 g/cc to 0.930 g/cc, or from 0.917 g/cc to 0.925 g/cc, and a melt index from 0.1 g/10 min to 200 g/10 min, or from 0.1 g/10 min to 100 g/10 min, or from 0.1 g/10 min to 20.0 g/10 min.

In an embodiment, the ethylene-based polymer composition has one, some, or all of the following properties:

(i) an alkenes content from 0.05/1000 carbons, or 0.15/1000 carbons, or 0.3/1000 carbons, or 0.4/1000 carbons, to 1.0/1000 carbons, or 2.0/1000 carbons, or 3.0/1000 carbons; and/or (ii) a melt strength from 0.1 cN to 100 cN, and a melt index from 0.1 g/10 min to 200 g/10 min; and/or (iii) a G' value greater than or equal to C+D $\log(I_2)$, wherein C is 185 Pa and D is −90 Pa/log(g/10 min); and/or (iv) a GI200 value from 0.05 $mm^2/24.6\ cm^3$ to 20 $mm^2/24.6\ cm^3$; and/or (v) a density from 0.909 g/cc to 0.940 g/cc.

In an embodiment, the ethylene-based polymer composition has a Mw(abs) versus 12 relationship, with Mw(abs) less than or equal to $A+B(I_2)$, wherein A is $2.65\times10^5$ g/mol and B is $-8.00\times10^{-3}$ (g/mol)/(dg/min) (hereafter Equation A) and the ethylene-based polymer composition has a G' versus 12 relationship, wherein G' is greater than or equal to (≥) C+D $\log(I_2)$, where C is 185 Pa and D is −90 Pa/log(g/10 min) (hereafter Equation B). In other words, the present ethylene-based polymer has a Mw(abs) value less than the value from Equation A and G' value greater than the value from Equation B.

In an embodiment, the ethylene-based polymer composition is a low density polyethylene (LDPE) that includes, in polymerized form, ethylene monomer and the mixture of hydrocarbon-based molecules.

The present ethylene-based polymer composition is produced via in-reactor high pressure polymerization. Without being bound by any particular theory, it is believed that copolymerization of ethylene monomer and the mixture of hydrocarbon-based molecules may occur by multiple scenarios. Two possible scenarios are (i) reaction of propagating polymer chain (PC) with terminal alkene group of the hydrocarbon-based molecules followed by further propagation and termination, and (ii) reaction of propagating polymer chain (PC) with internal alkene group of the hydrocarbon-based molecules followed up by further propagation and termination.

Scenario (i)

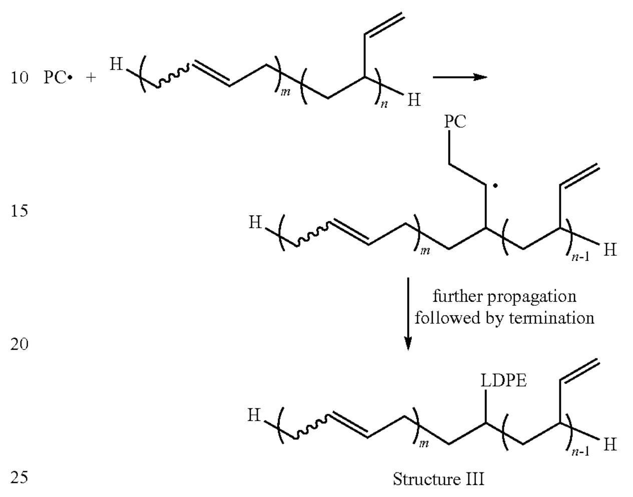

Structure III

The resultant ethylene-based polymer composition (Structure III) has polyethylene chain (LDPE) bonded directly to a hydrocarbon-based molecule. Single terminal alkene group or multiple terminal alkene groups can be attacked by propagating polymer chain (PC) leading to single or multiple LDPEs been attached to the hydrocarbon-based molecule. In an embodiment, two or more terminal alkene groups undergo copolymerization, while the remaining terminal alkene groups remain unreacted.

Scenario (ii)

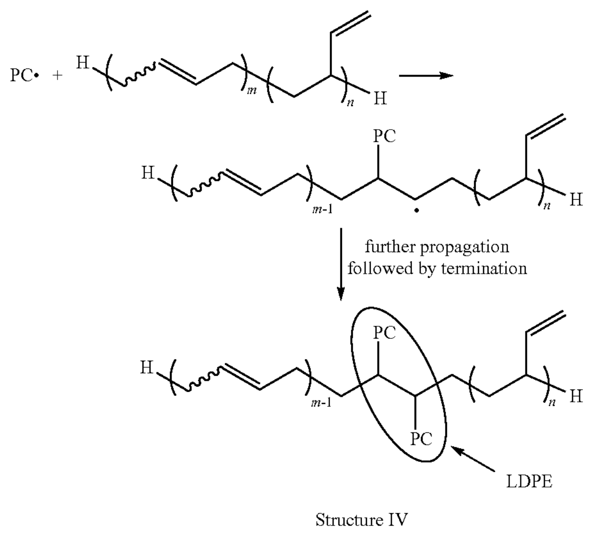

Structure IV

The resultant ethylene-based polymer composition (Structure IV) has two polyethylene chains bonded to a hydrocarbon-based molecule at the internal alkene group reaction point (in the "m" section of a hydrocarbon-based molecule) that combine to form an LDPE unit. Single internal alkene group or multiple internal alkene groups can be attacked by propagating polymer chain (PC) leading to single or multiple LDPEs that are copolymerized with the hydrocarbon-based molecule. In embodiments, two or more internal alkene groups undergo reaction, while the remaining internal alkene groups remain unreacted. A single internal and/or terminal alkene group or multiple internal and/or external alkene groups can be attacked by propagating polymer chain (PC) leading to single or multiple LDPEs that are copolymerized with the hydrocarbon-based molecule. In an embodiment, two or more alkene groups undergo reaction, while the remaining internal alkene groups remain unreacted.

Final product of the in-reactor reaction of the growing polymer chain at the terminal alkene group (scenario I above) followed by further propagation and termination differs from post-reactor terminal alkene group grafting. Post-reactor terminal alkene group grafting is shown below:

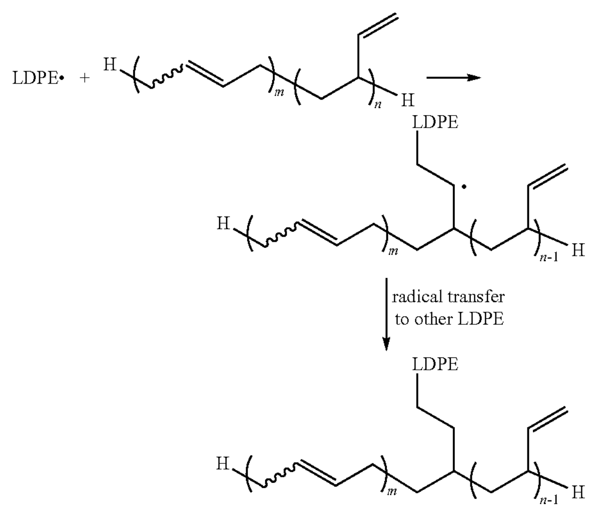

In post-reactor terminal alkene group grafting, LDPE is bonded to a hydrocarbon-based molecule at the terminal alkene group reaction point. A separate molecule, normally another LDPE, reacts with the intermediate product to form the resultant ethylene-based polymer composition.

Final product of the in-reactor reaction of the growing polymer chain at the internal alkene group followed by further propagation and termination (scenario ii above) differs from post-reactor internal alkene grafting. Post-reactor internal alkene grafting is shown below:

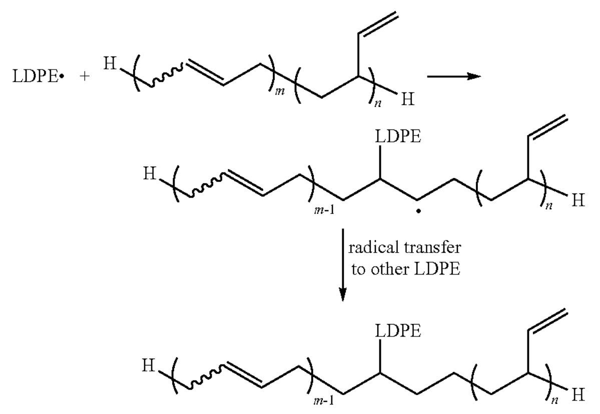

In post-reactor internal alkene grafting reaction, LDPE is bonded to a hydrocarbon-based molecule at the internal alkene group reaction point. A separate molecule, typically another LDPE, reacts with the intermediate product to form the resultant ethylene-based polymer composition.

In an embodiment, the ethylene-based polymer composition has Structure III and/or Structure IV as discussed above, and has one, some, or all of the following properties:

(i) an alkenes content from 0.05/1000 carbons, or 0.15/1000 carbons, or 0.3/1000 carbons, or 0.4/1000 carbons to 1.0/1000 carbons, or 2.0/1000 carbons, or 3.0/1000 carbons; and/or (ii) a melt strength from 0.1 cN to 100 cN, and a melt index from 0.1 g/10 min to 200 g/10 min; and/or (iii) a G' value greater than or equal to C+D $\log(I_2)$, where C is 185 Pa and D is −90 Pa/log(g/10 min); and/or (iv) a GI200 value from 0 $mm^2/24.6\ cm^3$ to 20 $mm^2/24.6\ cm^3$; and/or (v) a density from 0.909 g/cc to 0.940 g/cc, and a melt index from 0.1 g/10 min to 200 g/10 min.

In embodiments, the ethylene-based polymer composition has a hexane extractable from 1.0 wt. % to 5.0 wt. %, based on the weight of the ethylene-based polymer composition. In one or more embodiments, the ethylene-based polymer composition has a hexane extractable from 1.0 wt. %, or 1.1 wt. %, or 1.5 wt. % to 2.6 wt. %, or 3.5 wt. %, or 5.0 wt. %. In embodiments, the ethylene-based polymer composition has a hexane extractable from 1.0 wt. % to 4.5 wt. %, or from 1.1 wt. % to 3.5 wt. %, or from 1.5 wt. % to 2.6 wt. %.

In embodiments, the ethylene-based polymer composition includes a blend component. The blend component is a polymer that does not include the mixture of the hydrocarbon-based molecules.

In embodiments, the blend component is an ethylene-based polymer that does not include the mixture of the hydrocarbon based molecules. Nonlimiting examples of suitable ethylene-based polymers include ethylene/alpha-olefin copolymer, ethylene/$C_3$-$C_8$ alpha-olefin copolymer, ethylene/$C_4$-$C_8$ alpha-olefin copolymer, and copolymers of ethylene and one or more of the following comonomers: acrylate, (meth)acrylic acid, (meth)acrylic ester, carbon monoxide, maleic anhydride, vinyl acetate, vinyl propionate, mono esters of maleic acid, diesters of maleic acid, vinyl trialkoxysilane, vinyl trialkyl silane, and any combination thereof.

In embodiments, the blend component is an ethylene-based polymer having a density from 0.890 g/cc, or 0.900 g/cc, or 0.905 g/cc, or 0.910 g/cc, or 0.915 g/cc, or 0.917 g/cc to 0.925 g/cc, or 0.930 g/cc, or 0.935 g/cc, or 0.940 g/cc, or 1.05 g/cc. In one or more embodiments, the ethylene-based polymer that is the blend component has a density from 0.900 g/cc to 0.940 g/cc, or from 0.905 g/cc to 0.935 g/cc, or from 0.910 g/cc to 0.930 g/cc, or from 0.915 g/cc to 0.925 g/cc, or from 0.917 g/cc to 0.925 g/cc.

According to embodiments, the ethylene-based polymer has a melt strength from 6.0 cN to 30.0 cN, such as from 8.0 cN to 30.0 cN, from 10.0 cN to 30.0 cN, from 12.0 cN to 30.0 cN, from 14.0 cN to 30.0 cN, from 16.0 cN to 30.0 cN, from 18.0 cN to 30.0 cN, from 20.0 cN to 30.0 cN, from 22.0 cN to 30.0 cN, from 24.0 cN to 30.0 cN, from 26.0 cN to 30.0 cN, from 28.0 cN to 30.0 cN, from 6.0 cN to 28.0 cN, from 8.0 cN to 28.0 cN, from 10.0 cN to 28.0 cN, from 12.0 cN to 28.0 cN, from 14.0 cN to 28.0 cN, from 16.0 cN to 28.0 cN, from 18.0 cN to 28.0 cN, from 20.0 cN to 28.0 cN, from 22.0 cN to 28.0 cN, from 24.0 cN to 28.0 cN, from 26.0 cN to 28.0 cN, from 6.0 cN to 26.0 cN, from 8.0 cN to 26.0 cN, from 10.0 cN to 26.0 cN, from 12.0 cN to 26.0 cN, from 14.0 cN to 26.0 cN, from 16.0 cN to 26.0 cN, from 18.0 cN to 26.0 cN, from 20.0 cN to 26.0 cN, from 22.0 cN to 26.0 cN, from 24.0 cN to 26.0 cN, from 6.0 cN to 24.0 cN, from 8.0 cN to 24.0 cN, from 10.0 cN to 24.0 cN, from 12.0 cN to 24.0 cN, from 14.0 cN to 24.0 cN, from 16.0 cN to 24.0 cN, from 18.0 cN to 24.0 cN, from 20.0 cN to 24.0 cN, from 22.0 cN to 24.0 cN, from 6.0 cN to 22.0 cN, from 8.0 cN to 22.0 cN, from 10.0 cN to 22.0 cN, from 12.0 cN to 22.0 cN, from 14.0 cN to 22.0 cN, from 16.0 cN to 22.0 cN, from 18.0 cN to 22.0 cN, from 20.0 cN to 22.0 cN, from 6.0 cN to 20.0 cN, from 8.0 cN to 20.0 cN, from 10.0 cN to 20.0 cN, from 12.0 cN to 20.0 cN, from 14.0 cN to 20.0 cN, from 16.0 cN to 20.0 cN, from 18.0 cN to 20.0 cN, from 6.0 cN to 18.0 cN, from 8.0 cN to 18.0 cN, from 10.0 cN to 18.0 cN, from 12.0 cN to 18.0 cN, from 14.0 cN to 18.0 cN, from 16.0 cN to 18.0 cN, from 6.0 cN to 16.0 cN, from 8.0 cN to 16.0 cN, from 10.0 cN to 16.0 cN, from 12.0 cN to 16.0 cN, from 14.0 cN to 16.0 cN, from 6.0 cN to 14.0 cN, from 8.0 cN to 14.0 cN, from 10.0 cN to 14.0 cN, from 12.0 cN to 14.0 cN, from 6.0 cN to 12.0 cN, from 8.0 cN to 12.0 cN, from 10.0 cN to 12.0 cN, from 6.0 cN to 10.0 cN, from 8.0 cN to 10.0 cN, or from 6.0 cN to 8.0 cN. According to one or more embodiments, the ethylene-based polymer has a melt strength from 11.0 cN to 14.0 cN, such as from 11.5 cN to 14.0 cN, from 12.0 cN to 14.0 cN, from 12.5 cN to 14.0 cN, from 13.0 cN to 14.0 cN, from 13.5 cN to 14.0 cN, 11.0 cN to 13.5 cN, from 11.5 cN to 13.5 cN, from 12.0 cN to 13.5 cN, from 12.5 cN to 13.5 cN, from 13.0 cN to 13.5 cN, 11.0 cN to 13.0 cN, from 11.5 cN to 13.0 cN, from 12.0 cN to 13.0 cN, from 12.5 cN to 13.0 cN, 11.0 cN to 12.5 cN, from 11.5 cN to 12.5 cN, from 12.0 cN to 12.5 cN, 11.0 cN to 12.0 cN, from 11.5 cN to 12.0 cN, or 11.0 cN to 11.5 cN.

In embodiments, the ethylene-based polymer has a viscosity ($V_{0.1}$) at 0.1 radians/second (rad/s) from 3,000 Pascal second (Pa*s) to 30,000 Pa*s, such as from 5,000 Pa*s to 30,000 Pa*s, from 8,000 Pa*s to 30,000 Pa*s, from 10,000 Pa*s to 30,000 Pa*s, from 13,000 Pa*s to 30,000 Pa*s, from 15,000 Pa*s to 30,000 Pa*s, from 18,000 Pa*s to 30,000 Pa*s, from 20,000 Pa*s to 30,000 Pa*s, from 23,000 Pa*s to 30,000 Pa*s, from 25,000 Pa*s to 30,000 Pa*s, from 28,000 Pa*s to 30,000 Pa*s, from 3,000 Pa*s to 28,000 Pa*s, from 5,000 Pa*s to 28,000 Pa*s, from 8,000 Pa*s to 28,000 Pa*s, from 10,000 Pa*s to 28,000 Pa*s, from 13,000 Pa*s to 28,000 Pa*s, from 15,000 Pa*s to 28,000 Pa*s, from 18,000 Pa*s to 28,000 Pa*s, from 20,000 Pa*s to 28,000 Pa*s, from 23,000 Pa*s to 28,000 Pa*s, from 25,000 Pa*s to 28,000 Pa*s, from 3,000 Pa*s to 25,000 Pa*s, from 5,000 Pa*s to 25,000 Pa*s, from 8,000 Pa*s to 25,000 Pa*s, from 10,000 Pa*s to 25,000 Pa*s, from 13,000 Pa*s to 25,000 Pa*s, from 15,000 Pa*s to 25,000 Pa*s, from 18,000 Pa*s to 25,000 Pa*s, from 20,000 Pa*s to 25,000 Pa*s, from 23,000 Pa*s to 25,000 Pa*s, from 3,000 Pa*s to 23,000 Pa*s, from 5,000 Pa*s to 23,000 Pa*s, from 8,000 Pa*s to 23,000 Pa*s, from 10,000 Pa*s to 23,000 Pa*s, from 13,000 Pa*s to 23,000 Pa*s, from 15,000 Pa*s to 23,000 Pa*s, from 18,000 Pa*s to 23,000 Pa*s, from 20,000 Pa*s to 23,000 Pa*s, from 3,000 Pa*s to 20,000 Pa*s, from 5,000 Pa*s to 20,000 Pa*s, from 8,000 Pa*s to 20,000 Pa*s, from 10,000 Pa*s to 20,000 Pa*s, from 13,000 Pa*s to 20,000 Pa*s, from 15,000 Pa*s to 20,000 Pa*s, from 18,000 Pa*s to 20,000 Pa*s, from 3,000 Pa*s to 18,000 Pa*s, from 5,000 Pa*s to 18,000 Pa*s, from 8,000 Pa*s to 18,000 Pa*s, from 10,000 Pa*s to 18,000 Pa*s, from 13,000 Pa*s to 18,000 Pa*s, from 15,000 Pa*s to 18,000 Pa*s, from 3,000 Pa*s to 15,000 Pa*s, from 5,000 Pa*s to 15,000 Pa*s, from 8,000 Pa*s to 15,000 Pa*s, from 10,000 Pa*s to 15,000 Pa*s, from 13,000 Pa*s to 15,000 Pa*s, from 3,000 Pa*s to 13,000 Pa*s, from 5,000 Pa*s to 13,000 Pa*s, from 8,000 Pa*s to 13,000 Pa*s, from 10,000 Pa*s to 13,000 Pa*s, from 3,000 Pa*s to 10,000 Pa*s, from 5,000 Pa*s to 10,000 Pa*s, from 8,000 Pa*s to 10,000 Pa*s, from 3,000 Pa*s to 8,000 Pa*s, from 5,000 Pa*s to 8,000 Pa*s, or from 3,000 Pa*s to 5,000 Pa*s.

In embodiments, the ethylene-based polymer has a viscosity ($V_{100}$) at 100 rad/s from 200 Pa*s to 800 Pa*s, such as from 250 Pa*s to 800 Pa*s, from 300 Pa*s to 800 Pa*s, from 350 Pa*s to 800 Pa*s, from 400 Pa*s to 800 Pa*s, from 450 Pa*s to 800 Pa*s, from 500 Pa*s to 800 Pa*s, from 550 Pa*s to 800 Pa*s, from 600 Pa*s to 800 Pa*s, from 650 Pa*s to 800 Pa*s, from 700 Pa*s to 800 Pa*s, from 750 Pa*s to 800 Pa*s, from 200 Pa*s to 750 Pa*s, from 250 Pa*s to 750 Pa*s, from 300 Pa*s to 750 Pa*s, from 350 Pa*s to 750 Pa*s, from 400 Pa*s to 750 Pa*s, from 450 Pa*s to 750 Pa*s, from 500 Pa*s to 750 Pa*s, from 550 Pa*s to 750 Pa*s, from 600 Pa*s to 750 Pa*s, from 650 Pa*s to 750 Pa*s, from 700 Pa*s to 750 Pa*s, from 200 Pa*s to 700 Pa*s, from 250 Pa*s to 700 Pa*s, from 300 Pa*s to 700 Pa*s, from 350 Pa*s to 700 Pa*s, from 400 Pa*s to 700 Pa*s, from 450 Pa*s to 700 Pa*s, from 500 Pa*s to 700 Pa*s, from 550 Pa*s to 700 Pa*s, from 600 Pa*s to 700 Pa*s, from 650 Pa*s to 700 Pa*s, from 200 Pa*s to 650 Pa*s, from 250 Pa*s to 650 Pa*s, from 300 Pa*s to 650 Pa*s, from 350 Pa*s to 650 Pa*s, from 400 Pa*s to 650 Pa*s, from 450 Pa*s to 650 Pa*s, from 500 Pa*s to 650 Pa*s, from 550 Pa*s to 650 Pa*s, from 600 Pa*s to 650 Pa*s, from 200 Pa*s to 600 Pa*s, from 250 Pa*s to 600 Pa*s, from 300 Pa*s to 600 Pa*s, from 350 Pa*s to 600 Pa*s, from 400 Pa*s to 600 Pa*s, from 450 Pa*s to 600 Pa*s, from 500 Pa*s to 600 Pa*s, from 550 Pa*s to 600 Pa*s, from 200 Pa*s to 550 Pa*s, from 250 Pa*s to 550 Pa*s, from 300 Pa*s to 550 Pa*s, from 350 Pa*s to 550 Pa*s, from 400 Pa*s to 550 Pa*s, from 450 Pa*s to 550 Pa*s, from 500 Pa*s to 550 Pa*s, from 200 Pa*s to 500 Pa*s, from 250 Pa*s to 500 Pa*s, from 300 Pa*s to 500 Pa*s, from 350 Pa*s to 500 Pa*s, from 400 Pa*s to 500 Pa*s, from 450 Pa*s to 500 Pa*s, from 200 Pa*s to 450 Pa*s, from 250 Pa*s to 450 Pa*s, from 300 Pa*s to 450 Pa*s, from 350 Pa*s to 450 Pa*s, from 400 Pa*s to 450 Pa*s, from 200 Pa*s to 400 Pa*s, from 250 Pa*s to 400 Pa*s, from 300 Pa*s to 400 Pa*s, from 350 Pa*s to 400 Pa*s, from 200 Pa*s to 350 Pa*s, from 250 Pa*s to 350 Pa*s, from 300 Pa*s to 350 Pa*s, from 200 Pa*s to 300 Pa*s, from 250 Pa*s to 300 Pa*s, or from 200 Pa*s to 250 Pa*s.

In embodiments, the ethylene-based polymer has a viscosity ratio ($V_{0.1}/V_{100}$) from 8.0 to 50.0, such as from 10.0 to 50.0, from 15.0 to 50.0, from 20.0 to 50.0, from 25.0 to 50.0, from 30.0 to 50.0, from 35.0 to 50.0, from 40.0 to 50.0, from 45.0 to 50.0, from 8.0 to 45.0, from 10.0 to 45.0, from 15.0 to 45.0, from 20.0 to 45.0, from 25.0 to 45.0, from 30.0 to 45.0, from 35.0 to 45.0, from 40.0 to 45.0, from 8.0 to 40.0, from 10.0 to 40.0, from 15.0 to 40.0, from 20.0 to 40.0, from 25.0 to 40.0, from 30.0 to 40.0, from 35.0 to 40.0, from 8.0 to 35.0, from 10.0 to 35.0, from 15.0 to 35.0, from 20.0 to 35.0, from 25.0 to 35.0, from 30.0 to 35.0, from 8.0 to 30.0, from 10.0 to 30.0, from 15.0 to 30.0, from 20.0 to 30.0, from 25.0 to 30.0, from 8.0 to 25.0, from 10.0 to 25.0, from 15.0 to 25.0, from 20.0 to 25.0, from 8.0 to 20.0, from 10.0 to 20.0, from 15.0 to 20.0, from 8.0 to 15.0, from 10.0 to 15.0, or from 8.0 to 10.0.

In one or more embodiments, the ethylene-based polymer has a molecular weight distribution (MWD) as measured by gel permeation chromatography (GPC) from 3.0 to 25.0, such as from 4.0 to 25.0, from 6.0 to 25.0, from 8.0 to 25.0, from 10.0 to 25.0, from 12.0 to 25.0, from 14.0 to 25.0, from 16.0 to 25.0, from 18.0 to 25.0, from 20.0 to 25.0, from 22.0 to 25.0, from 24.0 to 25.0, from 3.0 to 24.0, from 4.0 to 24.0, from 6.0 to 24.0, from 8.0 to 24.0, from 10.0 to 24.0, from 12.0 to 24.0, from 14.0 to 24.0, from 16.0 to 24.0, from 18.0 to 24.0, from 20.0 to 24.0, from 22.0 to 24.0, from 3.0 to 22.0, from 4.0 to 22.0, from 6.0 to 22.0, from 8.0 to 22.0, from 10.0 to 22.0, from 12.0 to 22.0, from 14.0 to 22.0, from 16.0 to 22.0, from 18.0 to 22.0, from 20.0 to 22.0, from 3.0 to 20.0, from 4.0 to 20.0, from 6.0 to 20.0, from 8.0 to 20.0, from 10.0 to 20.0, from 12.0 to 20.0, from 14.0 to 20.0, from 16.0 to 20.0, from 18.0 to 20.0, from 3.0 to 18.0, from 4.0 to 18.0, from 6.0 to 18.0, from 8.0 to 18.0, from 10.0 to 18.0, from 12.0 to 18.0, from 14.0 to 18.0, from 16.0 to 18.0, from 3.0 to 16.0, from 4.0 to 16.0, from 6.0 to 16.0, from 8.0 to 16.0, from 10.0 to 16.0, from 12.0 to 16.0, from 14.0 to 16.0, from 3.0 to 14.0, from 4.0 to 14.0, from 6.0 to 14.0, from 8.0 to 14.0, from 10.0 to 14.0, from 12.0 to 14.0, from 3.0 to 12.0, from 4.0 to 12.0, from 6.0 to 12.0, from 8.0 to 12.0, from 10.0 to 12.0, from 3.0 to 10.0, from 4.0 to 10.0, from 6.0 to 10.0, from 8.0 to 10.0, from 3.0 to 8.0, from 6.0 to 8.0, or from 3.0 to 6.0.

In embodiments, the blend component has a melt index ($I_2$) from 0.1 to 200 g/10 min.

In embodiments, the blend component is a high density polyethylene (HDPE).

In embodiments, the blend component is linear low density polyethylene (LLDPE).

In embodiments, the blend component is a low density polyethylene (LDPE).

In one or more embodiments, the blend component is an ethylene/alpha-olefin copolymer. In embodiments, the alpha-olefin of the blend component is a $C_3$-$C_8$ alpha-olefin, or a $C_4$-$C_8$ alpha-olefin.

In one or more embodiments, the blend component is a copolymer of ethylene and one or more of the following comonomers: acrylate, (meth)acrylic acid, (meth)acrylic ester, carbon monoxide, maleic anhydride, vinyl acetate, vinyl propionate, mono esters of maleic acid, diesters of maleic acid, vinyl trialkoxysilane, vinyl trialkyl silane, and any combination thereof.

Processes for Producing Ethylene-Based Polymers

Processes for producing the ethylene-based polymer composition disclosed and described herein will now be described. The process includes reacting, in a polymerization reactor under free-radical polymerization conditions and at a pressure greater than 100 MPa, ethylene monomer in the presence of the mixture of hydrocarbon-based molecules that have three or more terminal alkene groups. The process includes forming the present ethylene-based polymer composition.

In embodiments, the polymerization takes place in a reactor configuration comprising at least one tubular reactor or at least one autoclave reactor.

In embodiments, the polymerization takes place in a reactor configuration that includes at least one tubular reactor.

In embodiments, the polymerization takes place in a reactor configuration that includes at least one autoclave reactor.

In embodiments, the ethylene monomer is polymerized in the presence of at least 2 mole ppm (based on amount of total monomers in reaction feed) of the additive of the mixture of hydrocarbon-based molecules.

In embodiments, the polymerization pressure is greater than, or equal to, 100 MPa.

In embodiments, the polymerization takes place with at least one polymerization pressure from 100 MPa to 360 MPa.

In embodiments, the polymerization takes place with at least one temperature from 100° C. to 380° C.

According to one or more embodiments, a highly branched ethylene-based polymer composition is produced using a high pressure, free-radical initiated polymerization process. Two different high pressure free-radical initiated polymerization process types are known. In the first process type, an agitated autoclave reactor having one or more reaction zones is used. The autoclave reactor normally has several injection points for initiator or monomer feeds, or both. In the second process type, a jacketed tube is used as a reactor, which has one or more reaction zones. Suitable, but not limiting, reactor lengths may be from 100 meters to 3000 meters (m), or from 1000 meters to 2000 meters. The beginning of a reaction zone, for either type of reactor, is typically defined by the side injection of either initiator of the reaction, ethylene, chain transfer agent (or telomer), comonomer(s), as well as any combination thereof. A high pressure process can be carried out in autoclave reactors or tubular reactors having one or more reaction zones, or in a combination of autoclave reactors and tubular reactors, each comprising one or more reaction zones.

In embodiments, an initiator is injected prior to the reaction zone where free radical polymerization is to be induced.

In one or more embodiments, a conventional chain transfer agent (CTA) is used to control molecular weight.

In embodiments, one or more conventional CTAs are added to the polymerization process. Non-limiting examples of CTAs include propylene, isobutane, n-butane, 1-butene, methyl ethyl ketone, acetone, ethyl acetate, propionaldehyde, ISOPAR (ExxonMobil Chemical Co.), and isopropanol. In embodiments, the amount of CTA used in the process is from 0.01 weight percent to 10 weight percent of the total reaction mixture.

In embodiments, the process includes a process recycle loop to improve conversion efficiency.

In one or more embodiments, the polymerization takes place in a tubular reactor, such as described in international patent application PCT/US12/059469 (WO2013059042 (A1), filed Oct. 10, 2012. This patent application describes a multi zone reactor, which describes alternate locations of feeding fresh ethylene to control the ethylene to CTA ratio and therefore control polymer properties. Fresh ethylene monomer is simultaneously added in multiple locations to achieve the desired ethylene monomer to chain transfer ratio as described in international patent application PCT/US12/064284 (filed Nov. 9, 2012) (WO2013078018(A2). In a similar way, addition of fresh CTA addition points is carefully selected to control polymer properties. Fresh CTA is simultaneously added in multiple locations to achieve the desired CTA to ethylene monomer ratio. Likewise, the addition points and the amount of fresh branching agents, described in this application, are controlled to control gel formation while maximizing the desired property of increased melt strength and performance in targeted applications. Fresh branching agent is simultaneously added in multiple locations to achieve the desired branching agent to ethylene monomer ratio. The use of a branching agent and/or coupling agent to broaden molecular weight distribution and to increase the melt strength of the polymer will put further requirements on the distribution of the CTA and the branching agent along a reactor system in order to achieve the desired change in product properties without or minimizing potential negative impacts such as gel formation, reactor fouling, process instabilities, and minimizing the amount of branching agent.

In embodiments, the polymerization takes place in at least one tubular reactor. In a multi reactor system, the autoclave reactor precedes the tubular reactor. The addition points and amounts of fresh ethylene, fresh CTA, and fresh branching agent are controlled to achieve the desired ratios of CTA to ethylene monomer and branching agent to ethylene monomer in the feeds to and or in the reaction zones.

In embodiments, the branching agent is fed through a compression stage directly into the reaction zone or directly into the feed to the reaction zone. The choice of feed point into the reaction and/or a reaction zone depends on several factors, including, but not limited to, the solubility of the polyene in pressurized ethylene and/or solvent, the condensation of the polyene in pressurized ethylene, and/or fouling by premature polymerization of the branching agent in the pre-heater used to heat the reactor contents prior to injection of initiator.

In embodiments, the branching agent is fed directly into the reaction zone or directly into the feed to the reaction zone.

In one or more embodiments, branching agent is added prior to, or simultaneously with, the addition of the free-radical initiator, at the inlet of the reaction zone. In another embodiment, the branching agent is added prior to the initiator addition to allow for a good dispersion of the polyene.

In embodiments, the branching agent is fed only to reaction zone 1.

In embodiments, more branching agent, by mass, is added to reaction zone 1 as compared to the amount of polyene, by mass, added to a subsequent reaction zone.

In embodiments, the ethylene fed to the first reaction zone is from 10 percent to 100 percent of the total ethylene fed to the polymerization. In one or more embodiments, the ethylene fed to the first reaction zone is from 20 percent to 80 percent, further from 25 percent to 75 percent, further from 30 percent to 70 percent, further from 40 percent to 60 percent, of the total ethylene fed to the polymerization.

In embodiments, the process takes place in a reactor configuration that comprises at least one tubular reactor. In one or more embodiments, the maximum temperature in each reaction zone is from 150° C. to 360° C., further from 170° C. to 350° C., further from 200° C. to 340° C.

In embodiments, the polymerization pressure at the first inlet of the reactor is from 100 MPa to 360 MPa, further from 150 MPa to 340 MPa, further from 185 MPa to 320 MPa.

In one or more embodiments, the ratio of "the concentration of the CTA in the feed to reaction zone i" to "the concentration of the CTA in the feed added to reaction zone 1" is greater than, or equal to, 1.

In embodiments, the ratio of "the concentration of the CTA in the feed to reaction zone i" to "the concentration of the CTA in the feed added to reaction zone 1" is less than 1, further less than 0.8, further less than 0.6, further less than 0.4.

In embodiments, the number of reaction zones range from 3 to 6.

Non-limiting examples of ethylene monomer used for the production of the ethylene-based polymer composition include purified ethylene, which is obtained by removing polar components from a loop recycle stream, or by using a reaction system configuration, such that only fresh ethylene is used for making the inventive polymer. Further examples of ethylene monomer include ethylene monomer from a recycle loop.

In embodiments, the ethylene-based polymer composition includes ethylene monomer, the mixture of hydrocarbon-based molecules (Structure I or Structure II), and one or more comonomers, and preferably one comonomer. Non-limiting examples of suitable comonomers include α-olefins, acrylates, carbon monoxide, methacrylates, (meth) acrylic acid, monoesters of maleic acid, diesters of maleic acid, anhydrides, vinyl acetate, vinyl propionate, vinyl trialkoxysilanes, vinyl trialkyl silanes each having no more than 20 carbon atoms. The α-olefin comonomers have from 3 to 10 carbon atoms, or in the alternative, the α-olefin comonomers have from 4 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

In embodiments, the ethylene-based polymer composition includes ethylene monomer and at least one hydrocarbon-based molecules (Structure I or Structure II) as the only monomeric units.

In embodiments, free radical initiators are used to produce the inventive ethylene-based polymer compositions. Non-limiting examples of organic peroxides cyclic peroxides, diacyl peroxides, dialkyl peroxides, hydroperoxides, peroxycarbonates, peroxydicarbonates, peroxyesters, peroxyketals, t-butyl peroxy pivalate, di-t-butyl peroxide, t-butyl peroxy acetate and t-butyl peroxy-2-hexanoate, and combinations thereof. In one or more embodiments, these organic peroxy initiators are used in an amount from 0.001 wt. % to 0.2 wt. %, based upon the weight of polymerizable monomers.

In embodiments, an initiator is added to at least one reaction zone of the polymerization, and wherein the initiator has a "half-life temperature at one second" greater than 255° C., or greater than 260° C.

In one or more embodiments, such initiators are used at a peak polymerization temperature from 320° C. to 350° C.

In embodiments, the initiator includes at least one peroxide group incorporated in a ring structure. Non-limiting examples of initiators include TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators.

In one or more embodiments, the configuration of the tubular reactor includes three to five reaction zones, with fresh ethylene fed to the front of the tubular reactor, and recycled ethylene fed to the side of the tubular reactor. Fresh CTA is fed to the side of the tubular reactor. The mixture of hydrocarbon-based molecules is fed to the front of the tubular reactor, with direct feed of the mixture of hydrocarbon-based molecules after preheating of the tubular reactor.

In embodiments, the ethylene-based polymer composition includes ethylene monomer, the mixture of hydrocarbon-based molecules that are structural isomers of polybutadiene and/or have different terminal groups (Structure III or Structure IV), and one or more comonomers, and preferably one comonomer. Non-limiting examples of suitable comonomers include α-olefins, acrylates, carbon monoxide, methacrylates, (meth)acrylic acid, monoesters of maleic acid, diesters of maleic acid, anhydrides, vinyl acetate, vinyl propionate, vinyl trialkoxysilanes, vinyl trialkyl silanes each having no more than 20 carbon atoms. The α-olefin comonomers have from 3 to 10 carbon atoms, or in the alternative, the α-olefin comonomers have from 4 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

Structure III

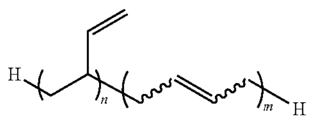

wherein m (the number of both cis- and trans-internal alkene groups) is from 3 to 90, and the value for m is greater than the value for n (m>n). In a further embodiment, m>n and m is from 3 to 90 and n is from 0 to 5; or m is from 6 to 60 and n is from 0 to 5; or m is from 9 to 50 and n is from 1 to 4.

Structure IV

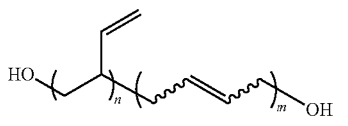

wherein n is from 1 to 20 and m from 10 to 90.

Ethylene-Based Polymer Foams

According to embodiments disclosed and described herein, the ethylene-based polymer compositions described above are combined with one or more foaming components to produce an ethylene-based polymer foamable composition and consequently an ethylene-based polymer foam. Such foaming components include, but are not limited to blowing agents, cell nucleating agents, permeability modifiers or stability control agents, and other additives, which are described in more detail below.

According to embodiments, the ethylene-based polymer foamable composition comprises ethylene-based polymer composition and one or more of blowing agents, cell nucleating agents, permeability modifiers or stability control agents, and other additives. According to one or more embodiments, the ethylene-based polymer composition may be present in an amount from 70.0 wt. % to 99.5 wt. %, from 75.0 wt. % to 98.0 wt. %, from 80.0 wt. % to 95.0 wt. %, or from 85.0 wt. % to 92.0 wt. % based on the total weight of the ethylene-based polymer foamable composition. According to embodiments, the ethylene-based polymer composition may be present in an amount based on the total weight of the ethylene-based polymer foamable composition that is from 92.5 wt. %, to 97.5 wt. %, such as from 93.0 wt. %, to 97.5 wt. % from 93.5 wt. %, to 97.5 wt. %, from 94.0 wt. %, to 97.5 wt. %, from 94.5 wt. %, to 97.5 wt. % from 95.0 wt. %, to 97.5 wt. %, from 95.5 wt. %, to 97.5 wt. %, from 96.0 wt. %, to 97.5 wt. % from 96.5 wt. %, to 97.5 wt. %, from 97.0 wt. %, to 97.5 wt. %, from 92.5 wt. %, to 97.0 wt. % from 93.0 wt. %, to 97.0 wt. %, from 93.5 wt. %, to 97.0 wt. %, from 94.0 wt. %, to 97.0 wt. % from 94.5 wt. %, to 97.0 wt. %, from 95.0 wt. %, to 97.0 wt. %, from 95.5 wt. %, to 97.0 wt. % from 96.0 wt. %, to 97.0 wt. %, from 96.5 wt. %, to 97.0 wt. %, from 92.5 wt. %, to 96.5 wt. % from 93.0 wt. %, to 96.5 wt. %, from 93.5 wt. %, to 96.5 wt. %, from 94.0 wt. %, to 96.5 wt. % from 94.5 wt. %, to 96.5 wt. %, from 95.0 wt. %, to 96.5 wt. %, from 95.5 wt. %, to 96.5 wt. % from 96.0 wt. %, to 96.5 wt. %, from 92.5 wt. %, to 96.0 wt. %, from 93.0 wt. %, to 96.0 wt. % from 93.5 wt. %, to 96.0 wt. %, from 94.0 wt. %, to 96.0 wt. %, from 94.5 wt. %, to 96.0 wt. % from 95.0 wt. %, to 96.0 wt. %, from 95.5 wt. %, to 96.0 wt. %, from 92.5 wt. %, to 95.5 wt. % from 93.0 wt. %, to 95.5 wt. %, from 93.5 wt. %, to 95.5 wt. %, from 94.0 wt. %, to 95.5 wt. % from 94.5 wt. %, to 95.5 wt. %, from 95.0 wt. %, to 95.5 wt. %, from 92.5 wt. %, to 95.0 wt. % from 93.0 wt. %, to 95.0 wt. %, from 93.5 wt. %, to 95.0 wt. %, from 94.0 wt. %, to 95.0 wt. % from 94.5 wt. % to 95.0 wt. %, from 92.5 wt. %, to 94.5 wt. %, from 93.0 wt. %, to 94.5 wt. % from 93.5 wt. %, to 94.5 wt. %, from 94.0 wt. %, to 94.5 wt. %, from 92.5 wt. %, to 94.0 wt. % from 93.0 wt. %, to 94.0 wt. %, from 93.5 wt. %, to 94.0 wt. %, from 92.5 wt. %, to 93.5 wt. % from 93.0 wt. %, to 93.5 wt. %, or from 92.5 wt. %, to 93.0 wt. %.

Blowing Agents

Blowing agents suitable for use in forming the extruded ethylene-based polymer foamable compositions and foams of embodiments may be physical blowing agents, which are typically the same material as the fugitive gas, e.g., $CO_2$, or a chemical blowing agent, which produces the fugitive gas. In one or more embodiments, more than one physical or chemical blowing agent may be used and physical and chemical blowing agents may be used together.

Physical blowing agents used in embodiments include any naturally occurring atmospheric material, which is a vapor at the temperature, and pressure at which the foam exits the die used to form the extruded ethylene-based polymer foam. The physical blowing agent may be introduced, (i.e., injected into the polymeric material) as a gas, a supercritical fluid, or liquid. According to embodiments, the physical blowing agent is introduced as a supercritical fluid or liquid, such as introduced as a liquid. The physical blowing agents used will depend on the properties sought in the resulting foam articles. Other factors considered in choosing a blowing agent are its toxicity, vapor pressure profile, ease of handling, and solubility with regard to the polymeric materials used. Non-flammable, non-toxic, non-ozone depleting blowing agents are preferred because they are easier to use, e.g., they have fewer environmental and safety concerns, and are generally less soluble in thermoplastic polymers. Nonlimiting examples of suitable physical blowing agent include $C_{1-6}$ hydrocarbons such as acetylene, propane, propene, n-butane, butene, butadiene, isobutane, isobutylene, cyclobutane, cyclopropane, ethane, methane, ethene, isomers of pentane, pentene, cyclopentane, pentene, pentadiene, hexane, cyclohexane, hexene, and hexadiene, Ci-5 organohalogens, Ci-6 alcohols, Ci-6 ethers, Ci-5 esters, Ci-5 amines, alcohols, ammonia, nitrogen, carbon dioxide, argon, water, neon, helium, and combinations thereof. In embodiments, the physical blowing agent is one or more of n-butane, isobutane, n-pentane, isopentane, neopentane, carbon dioxide, ethanol, and 1,1-difluoroethane (HFC-152a).

In embodiments, a chemical blowing agent is used and generates one or more physical blowing agents, by thermal decomposition in the process. Chemical blowing agents include (but are not limited to) azodicarbonamide, azodiisobutyro-nitrile, barium azodicarboxylate, N,N'-dimethyl-N,N'-dinitrosoterephthalamide, and benzenesulfonhydrazide, 4,4-oxybenzene sulfonyl semicarbazide, and p-toluene sulfonyl semicarbazide, trihydrazino triazine and mixtures such as those of citric acid and sodium bicarbonate. Examples of chemical blowing agents are the various products sold under the tradename Safoam™ (products of Reedy International; Reedy Chemical Foam).

The total amount of the blowing agent used depends on conditions such as extrusion-process conditions at mixing, the blowing agent being used, the composition of the extrudate, and the desired density of the foamed article. The extrudate (foamable composition) is defined herein as including the blowing agent, an ethylene-based polymer composition, and any additives. The physical blowing agent, (e.g., isobutane), may be present in an amount from 0.5 to 30 wt %, or from 2 to 25 wt %, or from 5 to 20 wt %, or from 8 to 15 wt %, based upon the total weight of the ethylene-based polymer foamable composition, depending on the particular embodiment. For a foam having a density of from about 1 to about 15 lb/ft$^3$, the extrudate, in embodiments, comprises from about 18 to about 1 wt. % of blowing agent. In embodiments, 1% to 10% of blowing agent may be used.

The blowing agent used according to embodiments comprises isobutane. In one or more embodiments, the blowing agent comprises less than or equal to 100 wt. % isobutane as a total composition of the blowing agent, such as less than 99 wt. %, less than 98 wt. %, less than 97 wt. %, less than 96 wt. %, or less than 97 wt. % isobutane. In embodiments, the blowing agent is a blend that comprises isobutane and $CO_2$. In one or more embodiments, the blowing agent blend comprises from 5 wt. % to 95 wt. % isobutane and from 5 wt. % to 95 wt. % $CO_2$.

According to embodiments disclosed and described herein, the blowing agent is added as a superaddition to the ethylene-based polymer composition; meaning that the blowing agent is not a constituent part of the ethylene-based polymer composition. As a non-limiting example, where 100 grams of the ethylene-based polymer composition is present and a 10 wt. % blowing agent superaddition is included, 10 grams of blowing agent will be added (100 grams×10%). In another non-limiting example, where 150 grams of the ethylene-based polymer composition is present and a 5 wt. % blowing agent superaddition is included, 7.5 grams of blowing agent will be added (150 grams×5%).

According to embodiments, the blowing agent may be added as a superaddition to the ethylene-based polymer composition to yield amounts from 1 wt. % to 5 wt. %, such as from 2 wt. % to 5 wt. %, from 3 wt. % to 5 wt. %, from 4 wt. % to 5 wt. %, from 1 wt. % to 4 wt. %, from 2 wt. % to 4 wt. %, from 3 wt. % to 4 wt. %, from 1 wt. % to 3 wt. %, from 2 wt. % to 3 wt. %, or from 1 wt. % to 2 wt. %, based upon the total weight of the ethylene-based polymer foamable composition.

Cell Nucleating Agents

A cell nucleating agent or combination of such agents may be employed according to one or more embodiments for advantages, such as regulating cell formation and morphology. A cell nucleating agent, or cell size control agent, may be any conventional or useful cell nucleating agent(s). The amount of cell nucleating agent used depends upon the desired cell size, the selected blowing agent blend, and the desired foam density. The cell nucleating agent is generally added in amounts from about 0.01 to about 20 wt. % of the ethylene-based polymer composition.

Some contemplated cell nucleating agents include inorganic materials (in small particulate form), such as clay, talc, silica, and diatomaceous earth. Other contemplated cell nucleating agents include organic cell nucleating agents that decompose or react at the heating temperature within an extruder to evolve gases, such as carbon dioxide, water, and/or nitrogen. One example of an organic cell nucleating agent is a combination of an alkali metal salt of a polycarboxylic acid with a carbonate or bicarbonate. Some examples of alkali metal salts of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate, respectively), and the disodium salt of ethanedioic acid (commonly referred to as sodium oxalate), or polycarboxylic acid such as 2-hydroxy-1,2,3-propanetricarboxylic acid. Some examples of a carbonate or a bicarbonate include, but are not limited to, sodium carbonate, sodium bicarbonate, potassium carbonate, potassium bicarbonate, and calcium carbonate.

It is contemplated that mixtures of different cell nucleating agents may be included in foam articles according to embodiments disclosed and described herein. Some more desirable cell nucleating agents include talc, crystalline silica, and a stoichiometric mixture of citric acid and sodium bicarbonate (the stoichiometric mixture having a 1 to 100 percent concentration where the carrier is a suitable polymer such as polyethylene). Talc, or other cell nucleating agents, may be added in a carrier or in a powder form.

Cell nucleating agents are, according to embodiments, added as a proportion of the ethylene-based polymer composition. As an example, if 2 wt. % of cell nucleating agent is present, the ethylene-based polymer composition may, for example, comprise 98 wt. % ethylene-based polymer and 2 wt. % cell nucleating agents.

In embodiments, the cell nucleating agent is present in amounts from 0.1 wt. % to 2.0 wt. %, such as from 0.5 wt. % to 2.0 wt. %, from 1.0 wt. % to 2.0 wt. %, from 1.5 wt. % to 2.0 wt. %, from 0.1 wt. % to 1.5 wt. %, from 0.5 wt. % to 1.5 wt. %, from 1.0 wt. % to 1.5 wt. %, from 0.1 wt. % to 1.0 wt. %, from 0.5 wt. % to 1.0 wt. %, or from 0.1 wt. % to 0.5 wt. % based on the total weight of the ethylene-based polymer composition.

According to one or more embodiments, the cell nucleating agent is an inorganic cell nucleating agent. In embodiments, the inorganic cell nucleating agent is selected from the group consisting of clay, talc, silica, and diatomaceous earth.

Permeability Modifier or Stability Control Agents

Gas permeation agents or stability control agents may be employed in embodiments to assist in preventing or inhibiting collapsing of the foam. The stability control agents suitable for use in embodiments may include the partial esters of long-chain fatty acids with polyols described in U.S. Pat. No. 3,644,230, which is incorporated herein by reference in its entirety, saturated higher alkyl amines, saturated higher fatty acid amides, complete esters of higher fatty acids such as those described in U.S. Pat. No. 4,214,054, which is incorporated herein by reference in its entirety, and combinations thereof described in U.S. Pat. No. 5,750,584, which is incorporated herein by reference in its entirety.

The partial esters of fatty acids that may be desired as a stability control agent include the members of the generic class known as surface active agents or surfactants. One exemplary class of surfactants includes a partial ester of a fatty acid having 12 to 18 carbon atoms and a polyol having three to six hydroxyl groups. In embodiments, the partial esters of a long chain fatty acid with a polyol component of the stability control agent are glycerol monostearate, glycerol distearate or mixtures thereof. It is contemplated that other gas permeation agents or stability control agents may be employed in the present invention to assist in preventing or inhibiting collapsing of the foam.

Permeability modifiers or stability control agents are, according to embodiments, added as a proportion of the ethylene-based polymer composition. As an example, if 2 wt. % of permeability modifiers or stability control agents is present, the ethylene-based polymer composition may, for example, comprise 98 wt. % ethylene-based polymer and 2 wt. % permeability modifiers or stability control agents.

In embodiments, the permeability modifiers or stability control agents are present in amounts up to 2.0 wt. %, such as from 0.2 wt. % to 2.0 wt. %, from 0.5 wt. % to 2.0 wt. %, from 1.0 wt. % to 2.0 wt. %, from 0.1 wt. % to 1.5 wt. %, from 0.5 wt. % to 1.5 wt. %, from 1.0 wt. % to 1.5 wt. %, from 0.1 wt. % to 1.0 wt. %, from 0.5 wt. % to 1.0 wt. %, or from 0.1 wt. % to 0.5 wt. %.

In one or more embodiments, the foaming component includes a permeability modifier that comprise glycerol monostearate. According to embodiments, the permeability modifier comprising glycerol monostearate is present in amounts from 1 wt. % to 5 wt. % based on the total weight of the ethylene-based polymer composition.

Additives

According to embodiments, fillers, colorants, antistatic agents, conductive additives, light and heat stabilizers, anti-oxidants, acid scavengers, flame retardants, processing aids, extrusion aids, and foaming additives may be used in making the foam article. These optional ingredients may include, but are not limited to, calcium carbonate, titanium dioxide powder, polymer particles, hollow glass spheres, polymeric fibers such as polyolefin based staple monofilaments and the like.

For example, additives may include a wetting agent, fire retardants, surfactants, anti-static agents, anti-block agents, wax-based dispersions, pigments, neutralizing agents, thickeners, compatibilizers, brighteners, rheology modifiers, biocides, fungicides, reinforcing fibers, and other additives known to those skilled in the art. It should be understood that embodiments of foam articles disclosed and described herein do not include additives, including additives in other embodiments may be advantageous for product stability during and after the manufacturing process.

Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to embodiments of the present disclosure.

The foams described above may contain processing oils, plasticizers, and processing aids. Rubber processing oils having a certain ASTM designation and paraffinic, napthenic or aromatic process oils are all suitable for use. Generally from 0 to 150 parts, more preferably 0 to 100 parts, and most preferably from 0 to 50 parts of processing oils, plasticizers, and/or processing aids per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly)glycol esters, and metal salt-, especially Group 1 or 2 metal or zinc-, salt derivatives thereof.

For conventional TPO, TPV, and TPE applications, carbon black is one additive useful for UV absorption and stabilizing properties. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 cm3/100 g. Generally, smaller particle sized carbon blacks are employed, to the extent cost considerations permit. For many such applications the present polymers and blends thereof require little or no carbon black, thereby allowing considerable design freedom to include alternative pigments or no pigments at all.

In one or more embodiments, the foam may be impregnated with conductive carbon black, such as by impregnating the foam with an aqueous dispersion of conductive carbon black containing a binder or by impregnating the foam with a styrene butadiene binder containing conductive carbon or by wetting ethylene-based foam particles with binders and conductive carbon black and then molding to a desired configuration or by adding conductive carbon black to an ethylene-based prepolymer and then foaming.

Compositions according to embodiments disclosed herein may also contain anti-ozonants or anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl)phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are WINGSTAY™ S antioxidant, POLYSTAY™ 100 antioxidant, POLYSTAY™ 100 AZ antioxidant, POLYSTAY™ 200 antioxidant, WINGSTAY™ L antioxidant, WINGSTAY™ LHLS antioxidant, WINGSTAY™ K antioxidant, WINGSTAY™ 29 antioxidant, WINGSTAY™ SN-1 antioxidant, and IRGANOX™ antioxidants. In some applications, the anti-oxidants and anti-ozonants used will be non-staining and non-migratory.

For providing additional stability against UV radiation, hindered amine light stabilizers (HALS) and UV absorbers may be also used. Suitable examples include TINUVIN™ 123, TINUVIN™ 144, TINUVIN™ 622, TINUVIN™ 765, TINUVIN™ 770, and TINUVIN™ 780, available from Ciba Specialty Chemicals, and CHEMISORB™ T944, available from Cytex Plastics, Houston Tex., USA. A Lewis acid may be additionally included with a HALS compound in order to achieve superior surface quality, as disclosed in U.S. Pat. No. 6,051,681. Other embodiments may include a heat stabilizer, such as IRGANOX™ PS 802 FL, for example.

For some compositions, additional mixing processes may be employed to pre-disperse the heat stabilizers, anti-oxidants, anti-ozonants, carbon black, UV absorbers, and/or light stabilizers to form a masterbatch, and subsequently to form polymer blends therefrom.

In some embodiments, additives may also include processing aids such as stearates and stearic acids, perfumes, algae inhibitors, anti-microbiological and anti-fungus agents, flame retardants and halogen-free flame retardants, as well as slip and anti-block additives. Other embodiments may include PDMS to decrease the abrasion resistance of the polymer. Adhesion of the polymer may also be improved through the use of adhesion promoters or functionalization or coupling of the polymer with organosilane, polychloroprene (neoprene), or other grafting agents.

Additives are, according to embodiments, added as a proportion of the ethylene-based polymer composition. As an example, if 2 wt. % of additives is present, the ethylene-based polymer composition may, for example, comprise 98 wt. % ethylene-based polymer and 2 wt. % additives.

The sum of these additives may be present in an amounts from 0 wt. % to 10 wt. % of the ethylene-based polymer composition, such as from 1 wt. % to 10 wt. %, from 2 wt. % to 10 wt. %, from 3 wt. % to 10 wt. %, from 4 wt. % to 10 wt. %, from 5 wt. % to 10 wt. %, from 6 wt. % to 10 wt. %, from 7 wt. % to 10 wt. %, from 8 wt. % to 10 wt. %, from 9 wt. % to 10 wt. %, from 0 wt. % to 9 wt. %, from 1 wt. % to 9 wt. %, from 2 wt. % to 9 wt. %, from 3 wt. % to 9 wt. %, from 4 wt. % to 9 wt. %, from 5 wt. % to 9 wt. %, from 6 wt. % to 9 wt. %, from 7 wt. % to 9 wt. %, from 8 wt. % to 9 wt. %, from 0 wt. % to 8 wt. %, from 1 wt. % to 8 wt. %, from 2 wt. % to 8 wt. %, from 3 wt. % to 8 wt. %, from 4 wt. % to 8 wt. %, from 5 wt. % to 8 wt. %, from 6 wt. % to 8 wt. %, from 7 wt. % to 8 wt. %, from 0 wt. % to 7 wt. %, from 1 wt. % to 7 wt. %, from 2 wt. % to 7 wt. %, from 3 wt. % to 7 wt. %, from 4 wt. % to 7 wt. %, from 5 wt. % to 7 wt. %, from 6 wt. % to 7 wt. %, from 0 wt. % to 6 wt. %, from 1 wt. % to 6 wt. %, from 2 wt. % to 6 wt. %, from 3 wt. % to 6 wt. %, from 4 wt. % to 6 wt. %, from 5 wt. % to 6 wt. %, from 0 wt. % to 5 wt. %, from 1 wt. % to 5 wt. %, from 2 wt. % to 5 wt. %, from 3 wt. % to 5 wt. %, from 4 wt. % to 5 wt. %, from 0 wt. % to 4 wt. %, from 1 wt. % to 4 wt. %, from 2 wt. % to 4 wt. %, from 3 wt. % to 4 wt. %, from 0 wt. % to 3 wt. %, from 1 wt. % to 3 wt. %, from 2 wt. % to 3 wt. %, from 0 wt. % to 2 wt. %, from 1 wt. % to 2 wt. %, or from 0 wt. % to 1 wt. % based on the total weight of the ethylene-based polymer composition.

Foaming Processes

Foam products (sheets, tubes, planks, etc) according to embodiments disclosed herein may include a single layer or multiple layers as desired. The foam articles may be produced in any manner so as to result in at least one foam layer. The foam layers described herein may be made by a pressurized melt processing method such as an extrusion method. The extruder may be a tandem system, a single screw extruder, a twin screw extruder, or the like. The extruder may be equipped with multilayer annular dies, flat film dies and feedblocks, multi-layer feedblocks such as those disclosed in U.S. Pat. No. 4,908,278, which is incorporated herein by reference in its entirety, multi-vaned or multi-manifold dies such as a 3-layer vane die available from Cloeren, Orange, Tex. A foamable composition may also be made by combining a chemical blowing agent and polymer at a temperature below the decomposition temperature of the chemical blowing agent, and then later foamed. In some embodiments, the foam may be coextruded with one or more barrier layers.

One method of producing the foams described herein is by using an extruder, as mentioned above. In this case, the foamable composition or mixture (ethylene-based polymer, filler, blowing agent, etc., as desired) is extruded. As the foamable composition or mixture exits an extruder die and upon exposure to reduced pressure, the fugitive gas nucleates and forms cells within the polymer to create a foam article. Before the foamable composition exits the extruder die, it is cooled to a so-called "foaming temperature", in the case of extruded foams of low density (typically less than 0.200 g/cm$^3$).

Foams formed by the above described methods may be crosslinked using a peroxide curing agent and other curing agents that constitute heat activated curing systems in some embodiments. Heat activated curing systems may include at least one based on peroxides or sulfur or an epoxy. Heat activated curing systems may be combined with the other components during processing to provide for the crosslinking of the foams. In some embodiments, the foams may be crosslinked using a radiation induced curing system. Radiation activated curing may include at least one of e-beaming and gamma radiation. Radiation activated curing may be performed, in some embodiments, after the formation of a foam by the above-described methods. In some embodiments, the foams may be crosslinked by silane functionalization of one or more of the polymers before or during foam extrusion, followed by crosslinking of the foams that are produced (generally by aging at humid conditions). A silanol condensation catalyst is generally incorporated in the foamable composition to effect silane crosslinking.

One advantage of using the inventive ethylene-based polymers according to embodiments disclosed and described herein is that they provide the high melt strength of conventional highly-branched ethylene-based polymers, as well as a wide foaming temperature window (due to efficient cooling of the foamable composition before it exits the extruder die, arising from the relatively increased breadth of the molecular weight distribution, also known as polydispersity index). As used herein, a "foaming temperature window" is a temperature where the ethylene-based polymer can be made into a foam. For instance, at low temperatures, semi-crystalline polymers can experience "freeze off" where crystalline structures are still present and will present themselves as solid (unexpanded) domains in the foam article. At high temperatures, the viscosity of the polymer is not suitable for foaming. It should be understood that if the foaming window is too narrow, it becomes difficult to control temperature in such a way that adequate foaming is achieved. According to embodiments, the ethylene-based polymer disclosed and described herein has a foaming temperature window from 101° C. to 120° C., or 103° C. to 117° C., or 105° C. to 115° C., or 108° C. to 113° C.

One skilled in the art will appreciate that other methods of producing the foams disclosed herein may also be used.

Ethylene-Based Polymer Foam Properties

Ethylene-based polymer foams according to embodiments disclosed and described herein may be a closed-cell foam, which means that greater than or equal to 80% of the cells are closed, such as greater than 85% of the cells are closed, greater than 90% of the cells are closed, or greater than 95% of the cells are closed. Closed-cell content is measured by any conventionally known manner, by substracting the open-cell content from 100%. Open-cell content may be measured by any known method, such as that described ahead.

In one or more embodiments, the density of the ethylene-based polymer foam is less than or equal to 0.20 grams per cubic centimeter (g/cc), such as less than 0.18 g/cc, less than 0.16 g/cc, less than 0.14 g/cc, less than 0.12 g/cc, or less than 0.10 g/cc. According to one or more embodiments, the density of the ethylene-based foam is from 0.01 g/cc to 0.20 g/cc, such as from 0.02 g/cc to 0.20 g/cc, from 0.04 g/cc to 0.20 g/cc, from 0.06 g/cc to 0.20 g/cc, from 0.08 g/cc to 0.20 g/cc, from 0.10 g/cc to 0.20 g/cc, from 0.12 g/cc to 0.20 g/cc, from 0.14 g/cc to 0.20 g/cc, from 0.16 g/cc to 0.20 g/cc, from 0.18 g/cc to 0.20 g/cc, from 0.01 g/cc to 0.18 g/cc, from 0.02 g/cc to 0.18 g/cc, from 0.04 g/cc to 0.18 g/cc, from 0.06 g/cc to 0.18 g/cc, from 0.08 g/cc to 0.18 g/cc, from 0.10 g/cc to 0.18 g/cc, from 0.12 g/cc to 0.18 g/cc, from 0.14 g/cc to 0.18 g/cc, from 0.16 g/cc to 0.18 g/cc, from 0.01 g/cc to 0.16 g/cc, from 0.02 g/cc to 0.16 g/cc, from 0.04 g/cc to 0.16 g/cc, from 0.06 g/cc to 0.16 g/cc, from 0.08 g/cc to 0.16 g/cc, from 0.10 g/cc to 0.16 g/cc, from 0.12 g/cc to 0.16 g/cc, from 0.14 g/cc to 0.16 g/cc, from 0.01 g/cc to 0.14 g/cc, from 0.02 g/cc to 0.14 g/cc, from 0.04 g/cc to 0.14 g/cc, from 0.06 g/cc to 0.14 g/cc, from 0.08 g/cc to 0.14 g/cc, from 0.10 g/cc to 0.14 g/cc, from 0.12 g/cc to 0.14 g/cc, from 0.01 g/cc to 0.12 g/cc, from 0.02 g/cc to 0.12 g/cc, from 0.04 g/cc to 0.12 g/cc, from 0.06 g/cc to 0.12 g/cc, from 0.08 g/cc to 0.12 g/cc, from 0.10 g/cc to 0.12 g/cc, from 0.01 g/cc to 0.10 g/cc, from 0.02 g/cc to 0.10 g/cc, from 0.04 g/cc to 0.10 g/cc, from 0.06 g/cc to 0.10 g/cc, from 0.08 g/cc to 0.10 g/cc, from 0.01 g/cc to 0.08 g/cc, from 0.02 g/cc to 0.08 g/cc, from 0.04 g/cc to 0.08 g/cc, from 0.06 g/cc to 0.08 g/cc, from 0.01 g/cc to 0.06 g/cc, from 0.02 g/cc to 0.06 g/cc, from 0.04 g/cc to 0.06 g/cc, or from 0.01 g/cc to 0.04 g/cc.

Test Methods

Melt Index

Melt indices $I_2$ (or $I_2$) and $I_{10}$ (or I10) of polymer samples were measured in accordance to ASTM D-1238 (method B) at 190° C. and at 2.16 kg and 10 kg load, respectively. Their values are reported in g/10 min. Fractions of polymer samples were measured by collecting product polymer from the reactor which produces that specific fraction or portion of the polymer composition. For example, the first polyethylene fraction can be collected from the reactor producing the lower density, higher molecular weight component of the polymer composition. The polymer solution is dried under vacuum before the melt index measurement.

Melt Strength

The term "melt strength," as used herein, refers to the measure of the maximum tension applied to a polymer in a melted state, before the polymer breaks. Melt strength is measured at 190° C. using a Göettfert Rheotens 71.97 (Göettfert Inc.; Rock Hill, SC). The melted sample (from 25 to 50 grams) is fed with a Göettfert Rheotester 2000 capillary rheometer, equipped with a flat entrance angle (180 degrees), and of length of 30 mm and diameter of 2 mm. The sample is fed into the barrel (L=300 mm, Diameter=12 mm), compressed, and allowed to melt for 10 minutes, before being extruded at a constant piston speed of 0.265 mm/s, which corresponds to a wall shear rate of 38.2 $s^{-1}$ at the given die diameter. The extrudate passes through the wheels of the Rheotens, located at 100 mm below the die exit, and is pulled by the wheels downward, at an acceleration rate of 2.4 millimeters per square second ($mm/s^2$). The force (measured in centiNewtons, cN) exerted on the wheels is recorded as a function of the velocity of the wheels (in mm/s). Samples are repeated at least twice, until two curves of the force (in cN) as a function of strand velocity (in mm/s) superimpose, then the curve that had the highest velocity at the strand break is reported. Melt strength is reported as the plateau force before the strand breaks, in units of cN.

Density

Samples of polymer for density measurement were prepared according to ASTM D4703. Measurements were made, according to ASTM D792, Method B, within one hour of sample pressing.

Density of foam is measured in accordance with ASTM D-1622-88 with results reported in kilograms per cubic meter ($kg/m^3$) or grams per cubic centimeter (g/cc) at 25° C.

Gel Permeation Chromatography (GPC)

The chromatographic system consisted of a PolymerChar GPC-IR (Valencia, Spain) high temperature GPC chromatograph equipped with an internal IR5 infrared detector (IR5). The autosampler oven compartment was set at 1600 Celsius and the column compartment was set at 1500 Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQ 1)}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max}}{\text{Peak Width at } \frac{1}{2} \text{ height}} \right)^2 \quad \text{(EQ 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(EQ 3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 1600 Celsius under "low speed" shaking.

The calculations of Mn(GPC), Mw(GPC), and Mz(GPC) were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum^{i} IR_i}{\sum^{i}\left(IR_i / M_{polyethylene_i}\right)} \quad \text{(EQ 4)}$$

$$Mw_{(GPC)} = \frac{\sum^{i}\left(IR_i * M_{polyethylene_i}\right)}{\sum^{i} IR_i} \quad \text{(EQ 5)}$$

$$Mz_{(GPC)} = \frac{\sum^{i}\left(IR_i * M_{polyethylene_i}{}^2\right)}{\sum^{i}\left(IR_i * M_{polyethylene_i}\right)} \quad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

$$\text{Flowrate(effective)} = \text{Flowrate(nominal)} * \left(RV(FM\ \text{Calibrated})/RV(FM\ \text{Sample})\right) \quad \text{(EQ 7)}$$

Triple Detector GPC (TDGPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($MW_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™) Other respective moments, $Mn_{(Abs)}$ and $Mz_{(Abs)}$ are be calculated according to equations 8-9 as follows:

$$Mn_{(Abs)} = \frac{\sum^{i} IR_i}{\sum^{i}\left(IR_i / M_{Absolute_i}\right)} \quad \text{(EQ 8)}$$

$$Mz_{(Abs)} = \frac{\sum^{i}\left(IR_i * M_{Absolute_i}{}^2\right)}{\sum^{i}\left(IR_i * M_{Absolute_i}\right)} \quad \text{(EQ 9)}$$

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the infrared (IR5) chromatogram. Linear polyethylene standards are then used to establish polyethylene and polystyrene Mark-Houwink constants. Upon obtaining the constants, the two values are used to construct two linear reference conventional calibrations for polyethylene molecular weight and polyethylene intrinsic viscosity as a function of elution volume, as shown in Equations (10) and (11):

$$M_{PE}=(K_{PS}/K_{PE})^{1/\alpha_{PB}+1}\cdot M_{PS}^{\alpha_{PS}+1/\alpha_{PE}+1} \quad \text{(Eq. 10)}$$

$$[\eta]_{PE}=K_{PS}\cdot M_{PS}^{\alpha+1}/M_{PE}. \quad \text{(Eq. 11)}$$

The gpcBR branching index is a robust method for the characterization of long chain branching as described in Yau, Wallace W., "Examples of Using 3D-GPC-TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equations (8). The area calculation in Equation (5) and (8) offers more precision, because, as an overall sample area, it is much less sensitive to variation caused by detector noise and 3D-GPC settings on baseline and integration limits. More importantly, the peak area calculation is not affected by the detector volume offsets. Similarly, the high-precision sample intrinsic viscosity (IV) is obtained by the area method shown in Equation (12):

$$IV_w=\frac{\sum_i c_i IV_i}{\sum_i c_i}=\frac{\sum_i \eta_{sp_i}}{\sum_i c_i}=\frac{\text{Viscometer Area}}{\textit{Conc.}\text{ Area}} \quad \text{(Eq. 12)}$$

where $\eta_{spi}$ stands for the specific viscosity as acquired from the viscometer detector.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations (2) and (13):

$$[\eta]_{cc}=\frac{\sum_i c_i IV_{i,cc}}{\sum_i c_i}=\frac{\sum_i c_i K(M_{i,cc})^a}{\sum_i c_i} \quad \text{(Eq. 13)}$$

Equation (14) is used to determine the gpcBR branching index:

$$gpcBR=\left[\left(\frac{[\eta]_{cc}}{[\eta]}\right)\left(\frac{M_w}{M_{w,cc}}\right)^{\alpha_{PE}}-1\right] \quad \text{(Eq. 14)}$$

wherein [η] is the measured intrinsic viscosity, $[\eta]_{cc}$ is the intrinsic viscosity from the conventional calibration, Mw is the measured weight average molecular weight, and $Mw_{,cc}$ is the weight average molecular weight of the conventional calibration. The weight average molecular weight by light scattering (LS) using Equation (5) is commonly referred to as "absolute weight average molecular weight" or "Mw, Abs." The Mw,cc using conventional GPC molecular weight calibration curve ("conventional calibration") is often referred to as "polymer chain backbone molecular weight," "conventional weight average molecular weight," and "$Mw_{,GPC}$."

All statistical values with the "cc" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for a and Log K for the determination of gpcBR in this particular case are 0.725 and −3.391, respectively, for polyethylene, and 0.722 and −3.993, respectively, for polystyrene. These polyethylene coefficients were then entered into Equation 13.

Once the K and α values have been determined using the procedure discussed previously, the procedure is repeated using the branched samples. The branched samples are analyzed using the final Mark-Houwink constants obtained from the linear reference as the best "cc" calibration values.

The interpretation of gpcBR is straight forward. For linear polymers, gpcBR calculated from Equation (14) will be close to zero, since the values measured by LS and viscometry will be close to the conventional calibration standard. For branched polymers, gpcBR will be higher than zero, especially with high levels of long chain branching, because the measured polymer molecular weight will be higher than the calculated Mw,cc, and the calculated IVcc will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination. Fourier Transform Infrared analysis Determination of the amount of terminal (vinyl) and internal (or trans-) double bonds per 1000 carbons is by Fourier Transform Infrared analysis ("FTIR"). Sample films approximately 250-300 microns in thickness) used for FTIR analysis were compression molded by pressing approximately 0.5 g of pellets of the sample in a Carver hydraulic press with heated platens set to 190° C. The level of terminal alkenes and internal alkenes were measured following a procedure similar to the one outlined in ASTM method D6248.

Dynamic Rheological Analysis

Dynamic oscillatory shear measurements are conducted over a range of 0.1 rad $s^{-1}$ to 100 rad $s^{-1}$ at a temperature of 190° C. and 10% strain with stainless steel parallel plates of 25 mm diameter on the strain controlled rheometer ARES/ARES-G2 by TA Instruments, to determine the melt flow properties of the ethylene-based polymers. V0.1 and V100 are the viscosities at 0.1 and 100 rad $s^{-1}$ respectively (with V0.1/V100 being a measure of shear thinning characteristics).

DSC Crystallinity

Differential scanning calorimetry (DSC) can be used to measure the crystallinity of a polymer sample at a given temperature for a wide range of temperatures. For the examples, a TA model Q1000 DSC (TA Instruments, New Castle, DE) equipped with an RCS (refrigerated cooling system) cooling accessory and an auto-sampler module was used to perform the tests. During testing, a nitrogen purge gas flow of 50 mL/min was used. Resins were compression-molded into 3 mm thick by 1 inch circular plaques at 350° C. for 5 minutes under 1500 psi pressure in air. The sample was then taken out of the press and placed on a counter top to cool to room temperature (approximately 25° C.). A 3-10 mg sample of the cooled material was cut into a 6 mm diameter disk, weighed, placed in a light aluminum pan, and crimped shut. The sample was then tested for its thermal behavior.

The thermal behavior of the sample was determined by changing the sample temperature upwards and downwards to create a response versus temperature profile. The sample was first rapidly heated to 180° C. and held at an isothermal state for 3 minutes in order to remove any previous thermal history. Next, the sample was cooled to −40° C. at a 10° C./min cooling rate and held at −40° C. for 3 minutes. The sample was then heated to 150° C. at a 10° C./min heating rate. The cooling and second heating curves were recorded. The values determined were peak melting temperature ($T_m$), peak crystallization temperature ($T_c$), heat of fusion ($H_f$) (in J/g), and the calculated percent crystallinity for polyethylene samples using the following Equation 1:

$$\%\ \text{crystallinity} = \frac{H_f}{292\ \text{J/g}} \times 100 \quad \text{(Eq. 1)}$$

The heat of fusion ($H_f$) and the peak melting temperature are reported from the second heat curve. Peak crystallization temperature was determined from the cooling curve.

Foam Open Cell Content

Open cell content of the foam is measured with a pycnometer in accordance with ASTM D2856-94, and is reported as a percentage from 0% to 100%. Open cell content is also measured from the penetration height of red colored water when foam specimens are immersed in a beaker containing red colored water. The steps are as follows: (a) cut foam samples into 100 mm long specimens; (b) mark a line at 50 mm distance from one end of each specimen; (c) immerse foam specimen in beaker of red colored water to maintain constant 50 mm length under water for fixed time of 1 minute; (d) remove foam specimen from water and wipe the liquid on the surface; (e) slice the foam along its length in half, using a blade; (f) inspect the inner surfaces of the foam specimen, revealed by slicing, and determine how far up the water penetrated. The greater the height of colored water penetration, the greater the open cell content (as a qualitative measurement).

Cell Count and Cell Size

The term "cell count," or "average cell count," as used herein, is the number of cell wall intersections over a specified length. Cell count of the foam composition is measured over a specified length, by taking up to 10 measurements per foam specimen, and computing the average (i.e., "average cell count") per specified length.

The term "cell size," or "average cell size," as used herein, is a measure of the dimensions of foam cells. The cell size is determined by dividing the average cell count by the specified length and multiplying the result by 1.62, which is an established geometric factor for this purpose, as disclosed in Cellular Polymers, Vol. 21, No. 3, 165-194 (2002). Cell size (i.e., average cell size), is measured in accordance with ASTM D3576-77, and is reported in millimeters (mm).

Examples

The following examples illustrate features of the present disclosure but are not intended to limit the scope of the disclosure. The following experiments analyzed the performance of embodiments of the multilayer films described herein.

Ethylene-Based Polymer Used for Examples 1 to 6

An ethylene-based polymer according to embodiments disclosed and described herein was formed by the following process.

Polymerization was carried out in a tubular reactor with three reaction zones. Polybutadiene PB-1000 ("Additive A") was added to the first zone. In each reaction zone, pressurized water was used for cooling and/or heating the reaction medium by circulating this water through the jacket of the reactor. The inlet-pressure was 231 MPa, and the pressure drop over the whole tubular reactor system was about 30 MPa. Each reaction zone had one inlet and one outlet. Each inlet stream consisted of the outlet stream from the previous reaction zone and/or an added ethylene-rich feed stream. The non-converted ethylene, and other gaseous components in the reactor outlet, were recycled through a high pressure recycle and a low pressure recycle, and were compressed and distributed through a booster, a primary and a hyper (secondary) compressors. Organic peroxides (tert-Butyl peroxy-2-ethyl hexanoate and Di-tert-butyl peroxide) were fed into each reaction zone. Propylene was used as a chain transfer agent (CTA), and it was present in each reaction zone inlet, originating from the low pressure and high pressure recycle flows. Fresh ethylene was directed towards the first reaction zone.

After reaching the first peak temperature (maximum temperature) in reaction zone 1, the reaction medium was cooled with the aid of the pressurized water. At the outlet of reaction zone 1, the reaction medium was further cooled by injecting cold (55° C. to 60° C.), ethylene-rich feed and the reaction was re-initiated by feeding an organic peroxide system. This process was repeated at the end of the second reaction zone to enable further polymerization in the third reaction zone. The polymer was extruded and pelletized (about 30 pellets per gram), using a single screw extruder at a melt temperature around 230° C. to 250° C. The weight ratio of the ethylene-rich feed streams to the three reaction zones was 1.00:0.60:0.40. The internal process velocity was approximately 12.5, 9 and 11 m/sec for respectively the first, second, and third reaction zone. Additive A flow to the first zone was 30.5 kg per hour. Ethylene conversion was 27.7%. Additional conditions for the process are provided in Table 1 below.

TABLE 1

| Inlet-pressure, Mpa | Start-temp., ° C. | reinitiation temp. 2nd zone, ° C. | reinitiation temp. 3rd zone, ° C. | 1st Peak temp., ° C. | 2nd Peak temp.,° C. | 3rd Peak temp. ° C. |
|---|---|---|---|---|---|---|
| 231.0 | 140 | 154 | 212 | 293 | 292 | 292 |

TABLE 2

| GPC data for inventive example | | | |
|---|---|---|---|
| Conventional GPC-13 | | Absolute GPC | |
| $M_n$ | 13,200 | $M_n$ | 12,060 |
| $M_p$ | 51,240 | $M_w$ | 296,290 |
| $M_y$ | 91,800 | $M_z$(BB) | 1,212,030 |
| $M_w$ | 119,730 | $M_z$(abs) | 6,824,270 |
| $M_z$ | 657,570 | $M_{z+1}$(BB) | 2,499,170 |
| PDI (Mw/Mn) | 9.01 | $M_z/M_w$ | 23.03 |

Comparative Ethylene-Based Polymer Used for Comparative Example 1

For Comparative Example 1, an ethylene-based polymer was produced in a high pressure, free-radical initiated polymerization process with a jacketed tube as the reactor at pressures above 30,000 psig with 4 reaction zones controlled at peak temperatures above 275° C. Each reaction zone used varying amounts of mixtures of free-radical initiators such as tert-butyl peroxypivalate (PIV), tert-butyl peroxy-2-ethylhexanoate (TPO), tert-butyl peroxyacetate (TPA), and di-tert butyl peroxide (DTBP) to control the reactor temperature. Each initiator was added independently to each reaction zone. A flow of 4.3-kg/hr using a mix of PIV/TPO/TPA/DTBP was added for zone 1, a flow of 6.9-kg/hr using a mix of PIV/TPO/TPA/DTBP for zone 2, a flow of 3.1-kg/hr using a mix of PIV/TPO/TPA/DTBP for zone 3, and a flow of 1.3-kg/hr using a mix of PIV/TPO/TPA/DTBP was added for zone 4. Propionaldehyde was used as the chain transfer agent (CTA). The concentration of the CTA fed to the process was adjusted to control the melt index of the product. Ethylene used for the production of the ethylene-based polymer may be fresh ethylene without any recycle loop ethylene or a mixtures of fresh ethylene feed and process recycle loop streams.

The ethylene-based polymer used in Comparative Example 1 has a narrower MWD than the ethylene-based polymer used in Example 1 (6.29 compared to 9.01 as shown in Tables 2 and 3. Additionally, the gpcBr for the ethylene-based polymer used in Example 1 is 2.63, but the gpcBr of the ethylene-based polymer used in Comparative Example 1 is only 2.0. Thus, the ethylene-based polymer used in Example 1 has significantly more long chain branching than the ethylene-based polymer used in Comparative Example 1.

TABLE 3

| GPC data for Comparative Example 1 | | | |
|---|---|---|---|
| Conventional GPC-13 | | Absolute GPC | |
| $M_n$ | 15,290 | $M_n$ | 15,320 |
| $M_p$ | 62,200 | $M_w$ | 207,550 |
| $M_y$ | 78,410 | $M_z$(BB) | 892,710 |
| $M_w$ | 96,200 | $M_z$(abs) | 6,697,220 |
| $M_z$ | 401,570 | $M_{z+1}$(BB) | 1,995,320 |
| PDI (Mw/Mn) | 6.29 | $M_z/M_w$ | 32.27 |

Differences in various properties of the ethylene-based polymer of Examples 1 to 6 and the ethylene-based polymer of Comparative Example 1 are show in Table 4 below:

TABLE 4

| | MI ($I_2$) g/10 min | Melt Strength (cN) | Viscosity @ 0.1 rad/s (Pa*s) | Viscosity @ 100 rad/s (Pa*s) | Viscosity ratio (V0.1/V100) | Peak Melting Temperature (° C.) | Heat of Fusion (J/g) | Density (g/cc) |
|---|---|---|---|---|---|---|---|---|
| Comparative Ethylene-Based Polymer Used for Comp. Ex. 1 | 2.0 | 8 | 7074.32 | 493.11 | 14.34 | 110.8 | 157.5 | 0.923 |
| Ethylene-Based Polymer Used for Ex. 1 to 6 | 2.4 | 13 | 7462.58 | 425.04 | 17.56 | 107.8 | 155.0 | 0.9183 |

Preparation of Ethylene-Based Polymer Foam Articles

Ethylene-based polymer foams were prepared from the ethylene-based polymers described above using the following process.

Next, foams were prepared using the ethylene-based polymers. Foam compositions were prepared with a tandem extrusion system having a mixing extruder and a cooling extruder that was fed by the mixing extruder. The mixing extruder was a co-rotating twin screw extruder with 34 mm diameter screws specially configured to ensure good mixing of the polymer composition and blowing agent while forming the foamable composition. The mixing extruder was operated at a screw speed of 55 rpm and a set temperature across all zones of 180° C.

The cooling extruder was a single screw extruder with a 40 mm diameter screw. The barrel and the die temperatures of the cooling extruder were controlled among four zones using separate oil heaters. Zone 1 and Zone 2 were operated at set temperatures of 129° C. and 116° C., respectively. The set temperature of Zone 3 was the foaming temperature of the foamable composition. The cooling extruder was operated at a screw speed of 22 rpm. A 3 mm diameter rod die was attached at the end of the cooling extruder. The temperature of the die was maintained at 125° C.

The components of the polymer composition were dry blended and then fed into the inlet of the mixing extruder through a solid metering feeder. Complete melting of the polymer components was achieved and the blowing agent (isobutane), was injected into the mixing extruder at 20 L/D of the extruder using a positive displacement pump (dual piston HPLC pump). The flow rate of the polymer was maintained at 36 grams per minute (g/min). The residence time of the process, from addition of the solid components to the extruder inlet up to the exit die, was 12 minutes.

Foams of different compositions and densities were produced at various processing conditions, as set forth in Table 6.

HS-E01 is a masterbatch of glycerol monostearate (GMS), a permeability modifier, in a LDPE carrier resin. It is available from Polyvel Inc. and has the following properties: GMS content of 50%, alpha mono content of 90%, white color, melt index of 320 g/10 min and softening point of 70° C.

Mistron Vapor R is talc with median particle size of 2.2 μm and is available from Imerys Talc.

The components in parts for each of Examples 1 to 6 (Ex 1 to Ex 6) and Comparative Example 1 (CE 1) are shown in Table 6 below:

TABLE 6

| | CE 1 | Ex 1 | Ex 2 | Ex 3 | Ex 4 | Ex 5 | Ex 6 |
|---|---|---|---|---|---|---|---|
| Comparative Ethylene-Based Polymer (parts) | 97.5 | | | | | | |
| Ethylene-Based Polymer (parts) | | 97.5 | 97.5 | 97.5 | 97.5 | 97.5 | 97.5 |
| HS-E01 with glycerol monostearate (GMS) content of 50 wt %; permeability modifuier (parts) | 2 | 2 | 2 | 2 | 2 | 2 | 2 |
| Mistron Vapor R Talc; cell nucleating agent (parts) | 0.5 | 0.5 | 0.5 | 0.5 | 0.5 | 0.5 | 0.5 |
| Ethylene-Based Polymer composition (total parts) | 100 | 100 | 100 | 100 | 100 | 100 | 100 |
| Isobutane; Blowing Agent (parts) | 10 | 10 | 10 | 10 | 10 | 10 | 10 |
| Ethylene-Based Polymer Foamable composition (total parts) | 110 | 110 | 110 | 110 | 110 | 110 | 110 |
| Extruder Amps (Primary/Secondary) | 10/7 | 9/6 | 9/6 | 9/6 | 9/6 | 9/6 | 9/6 |
| Zone 3 Set Temperature (° C.) "Foaming Temperature" | 115.6 | 112.8 | 111.7 | 110.6 | 110.0 | 109.4 | 108.3 |
| Properties of Foam Composition | | | | | | | |
| Density (g/cc) | 0.069 | 0.071 | 0.077 | 0.069 | 0.070 | 0.065 | 0.064 |
| Cell type | closed | closed | closed | closed | closed | closed | closed |

For each of CE 1 and Ex 1 to Ex 6, GMS was present in an amount of 1 wt % in the polymer composition, and the isobutane was present in an amount of 9 wt % in the foamable composition.

Desirably closed-cell foams with different densities were produced at various processing conditions and samples were collected for characterization (Table 6).

In the case of Comparative Example 1, "freeze-off" occurred at 112° C. (1.2° C. above the peak crystalline melting point of the polymer), as evidenced by solid pieces in the foam composition coming through the die.

In the cases of Ex 1 to Ex 6, "freeze-off" did not occur at a temperature as low as 108.3° C. (0.5° C. above the peak crystalline melting point of the polymer). Furthermore, this polymer exhibited a broad foaming temperature window (from 108° C. to 113° C.). These are useful attributes for extrusion foaming, to minimize scrap production. Furthermore, by virtue of this polymer's relatively greater polydispersity index (PDI) and greater shear-thinning, one would anticipate desirably less shear-heating and better cooling on commercial (large scale) extrusion foaming lines. Additionally, the comparatively higher melt strength of ethylene-based polymers according to embodiments disclosed and described herein is a desirable characteristic for cell (bubble) stability during melt expansion (foaming).

The invention claimed is:

1. An extruded foam comprising:

an ethylene-based polymer composition comprising a polymerized ethylene-base monomer with hydrocarbon-based molecules having the following formula:

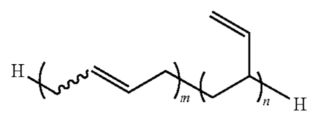

wherein n is from 3 to 160 and m is from 0 to 50, and wherein the ethylene-based polymer has a molecular weight distribution from 8 to 25.0.

2. The extruded foam of claim 1, wherein the extruded foam further comprises up to 2 wt. % of a permeability modifier based on the total weight of the ethylene-based polymer composition.

3. The extruded foam of claim 1, wherein the permeability modifier comprises glycerol monostearate.

4. The extruded foam of claim 1, wherein the extruded foam comprises additives selected from cell nucleating agents, antistatic agents, pigments, fillers, or combinations thereof.

5. The extruded foam of claim 1, wherein the extruded foam comprises a cell nucleating agent.

6. The extruded foam of claim 5, wherein the extruded foam comprises from 0.1 wt. % to 2.0 wt. % cell nucleating agent based on the total weight of the ethylene-based polymer composition.

7. The extruded foam of claim 1, wherein the extruded foam has a density less than or equal to 0.2 g/cc.

8. The extruded foam of claim 1, wherein the extruded foam has a density from 0.01 g/cc to 0.10 g/cc.

9. The extruded foam of claim 1, wherein the extruded foam is a closed cell foam.

10. The extruded foam of claim 1, wherein the extruded foam is produced with a blowing agent comprising one or more of isobutane, carbon dioxide, or mixtures thereof.

11. The extruded foam of claim 10, wherein the blowing agent is isobutane.

12. The extruded foam of claim 1, wherein the ethylene-based polymer has a melt strength of 6.0 cN to 30.0 cN at a velocity of 100 mm/s.

13. The extruded foam of claim 1, wherein the ethylene-based polymer has a melt strength of 11.0 cN to 14.0 cN at a velocity of 200 mm/s.

14. The extruded foam of claim 1, wherein the ethylene-based polymer has a viscosity ratio ($V_{0.1}/V_{100}$) from 15.0 to 50.0.

15. The extruded foam of claim 1, wherein the ethylene-based polymer composition comprises, in polymerized form, from 95.0 wt. % to 99.9 wt. of ethylene, and from 5.0 wt. % to 0.1 wt. % of the mixture of hydrocarbon-based molecules.

16. The extruded foam of claim 1, wherein the foam has a density of less than or equal to 0.20 grams per cubic centimeter (g/cc).

* * * * *